US012757142B2

(12) United States Patent
Wu et al.

(10) Patent No.: US 12,757,142 B2
(45) Date of Patent: Oct. 6, 2026

(54) WIRELESS COMMUNICATION METHOD FOR TIME-FREQUENCY DOMAIN SYNCHRONIZATION, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Zuomin Wu, Dongguan (CN); Haitao Li, Dongguan (CN); Yi Hu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 412 days.

(21) Appl. No.: 18/506,588

(22) Filed: Nov. 10, 2023

(65) Prior Publication Data

US 2024/0080786 A1 Mar. 7, 2024

Related U.S. Application Data

(63) Continuation of application No. PCT/CN2021/092879, filed on May 10, 2021.

(51) Int. Cl.
*H04W 72/0446* (2023.01)
*H04L 25/03* (2006.01)
(Continued)

(52) U.S. Cl.
CPC ... *H04W 56/0045* (2013.01); *H04L 25/03012* (2013.01); *H04L 27/2671* (2013.01);
(Continued)

(58) Field of Classification Search
CPC ........... H04L 25/03012; H04L 25/0222; H04L 27/2671; H04W 72/0446; H04W 72/232
See application file for complete search history.

(56) References Cited

U.S. PATENT DOCUMENTS

| | | | |
|---|---|---|---|
| 6,618,009 | B2 | 9/2003 | Griffin et al. |
| 2009/0278733 | A1 | 11/2009 | Haworth |

(Continued)

FOREIGN PATENT DOCUMENTS

| | | | |
|---|---|---|---|
| CN | 110324075 A | 10/2019 | |
| CN | 111867041 A | 10/2020 | |

(Continued)

OTHER PUBLICATIONS

3GPP, "TR 36.763 V.0.0.2", Feb. 2021, pp. 1-27 (Year: 2021).*
(Continued)

*Primary Examiner* — Salvador E Rivas
(74) *Attorney, Agent, or Firm* — Sheppard, Mullin, Richter & Hampton LLP

(57) ABSTRACT

A terminal device receives first information transmitted by a network device. The first information is associated with a first time period, and the first information is used to obtain at least one of: a first timing value, an offset rate of a first timing value, a rate of change of an offset rate of a first timing value, a first frequency offset value, an offset rate of a first frequency offset value, a rate of change of an offset rate of a first frequency offset value, first ephemeris information, the first time period, or one or more time domain positions corresponding to the first time period.

20 Claims, 6 Drawing Sheets

200

(51) Int. Cl.

| | |
|---|---|
| ***H04L 27/26*** | (2006.01) |
| ***H04W 56/00*** | (2009.01) |
| *H04L 25/02* | (2006.01) |
| *H04W 72/231* | (2023.01) |
| *H04W 72/232* | (2023.01) |

(52) U.S. Cl.
CPC ..... *H04W 72/0446* (2013.01); *H04L 25/0222* (2013.01); *H04W 72/231* (2023.01); *H04W 72/232* (2023.01)

(56) References Cited

U.S. PATENT DOCUMENTS

| | | | | |
|---|---|---|---|---|
| 2016/0183295 A1* | 6/2016 | Liu | .................. | H04W 72/0446 370/330 |
| 2020/0107299 A1* | 4/2020 | Zhou | ................. | H04W 72/0446 |
| 2020/0229155 A1* | 7/2020 | Chien | ................. | H04W 72/044 |
| 2021/0377825 A1* | 12/2021 | Deenoo | ................ | H04B 7/1851 |
| 2022/0272649 A1* | 8/2022 | Wiacek | ............. | H04W 56/0045 |

FOREIGN PATENT DOCUMENTS

| | | |
|---|---|---|
| CN | 112153748 A | 12/2020 |
| WO | 2020049096 A1 | 3/2020 |
| WO | 2020092561 A1 | 5/2020 |
| WO | 2021022442 A1 | 2/2021 |
| WO | 2021045786 A1 | 3/2021 |

OTHER PUBLICATIONS

International Search Report and Written Opinion dated Feb. 15, 2022 in International Application No. PCT/CN2021/092879 English translation attached.
Moderator (Thales), "FL Summary on enhancements on UL time and frequency synchronization for NR"3GPP TSG-RAN WG1 Meeting #104-bis-e R1-2104076, Apr. 21, 2021, Section 2, Section 14.
MediaTek, "UE Time and frequency Synchronisation for NR-NTN"3GPP TSG RAN WG1 Meeting #104-bis-e R1-2102752, Apr. 6, 2021, Section 2.2.
ZTE Corporation et al."R2-2009072 Consideration on the applicability of NR NTN to IoT over NTN" 3GPP TSG-RAN WG2 Meeting #112 E-meeting, Nov. 13, 2020 (Nov. 13, 2020).
ZTE Corporation et al. R2-2104190 Considerations on Random Access and TA3GPP TSG-RAN WG2 Meeting #113 bis electronic,Apr. 20, 2021(Apr. 20, 2021).
Huawei et al., "Discussion on Doppler compensation, timing advance and RACH for NTN", 3GPP TSG RAN WG1 Meeting #98bis, R1-1910064, Chongqing, China, Oct. 14-20, 2019.
Extended European search report issued by the EPO for Application No. EP21941204.6 dated Jun. 17, 2024.

* cited by examiner

WIRELESS COMMUNICATION METHOD FOR TIME-FREQUENCY DOMAIN SYNCHRONIZATION, TERMINAL DEVICE, AND NETWORK DEVICE

CROSS-REFERENCE TO RELATED APPLICATIONS

This application is a continuation of International Application No. PCT/CN2021/092879 filed on May 10, 2021, the entire disclosure of which is incorporated herein by reference.

TECHNICAL FIELD

The embodiments of the present disclosure relate to communication technology, and more particularly, to a wireless communication method, a terminal device, and a network device.

BACKGROUND

The 5-Generation mobile communication technology New Radio (5G NR) system defines system deployment scenarios of Non-Terrestrial Networks (NTNs) including satellite networks. With the satellites' wide-area coverage capabilities, the NTN system can achieve continuity of 5G NR services. However, in the NTN scenario, due to the long communication distance between a terminal device and a satellite (or network device), the propagation delay of signal communication is relatively high, which brings new challenges in time domain and frequency domain synchronization between the terminal device and the satellite.

SUMMARY

The embodiments of the present disclosure provide a wireless communication method, a terminal device, and a network device. The network device can notify the terminal device of first information corresponding to a first time period in a message, such that the terminal device can obtain time domain and/or frequency domain synchronization within the corresponding first time period according to the first information.

In a first aspect, a wireless communication method is provided. The method includes: receiving, by a terminal device, first information transmitted by a network device. The first information is associated with a first time period, and the first information is used to obtain at least one of: a first timing value, an offset rate of a first timing value, a rate of change of an offset rate of a first timing value, a first frequency offset value, an offset rate of a first frequency offset value, a rate of change of an offset rate of a first frequency offset value, first ephemeris information, the first time period, or one or more time domain positions corresponding to the first time period.

In a second aspect, a wireless communication method is provided. The method includes: transmitting, by the network device, first information to a terminal device, the first information being associated with a first time period. The first information is used to obtain at least one of: a first timing value, an offset rate of a first timing value, a rate of change of an offset rate of a first timing value, a first frequency offset value, an offset rate of a first frequency offset value, a rate of change of an offset rate of a first frequency offset value, first ephemeris information, the first time period, or one or more time domain positions corresponding to the first time period, or the first information includes at least one of: a first timing value, an offset rate of a first timing value, a rate of change of an offset rate of a first timing value, a first frequency offset value, an offset rate of a first frequency offset value, a rate of change of an offset rate of a first frequency offset value, first ephemeris information, the first time period, or one or more time domain positions corresponding to the first time period.

In a third aspect, a terminal device is provided. The terminal device is configured to perform the method according to the above first aspect. In particular, the terminal device includes one or more functional modules configured to perform the method according to the above first aspect.

In a fourth aspect, a network device is provided. The network device is configured to perform the method according to the above second aspect. In particular, the network device includes one or more functional modules configured to perform the method according to the above second aspect.

In a fifth aspect, a terminal device is provided. The terminal device includes a processor and a memory. The memory has a computer program stored thereon, and the processor is configured to invoke and execute the computer program stored in the memory to perform the method according to the above first aspect.

In a sixth aspect, a network device is provided. The network device includes a processor and a memory. The memory has a computer program stored thereon, and the processor is configured to invoke and execute the computer program stored in the memory to perform the method according to the above second aspect.

In a seventh aspect, an apparatus is provided. The apparatus is configured to perform the method according to the above first or second aspect. In particular, the apparatus includes a processor configured to invoke and execute a computer program from a memory, to cause a device installed with the apparatus to perform the method according to the above first or second aspect.

In an eighth aspect, a computer-readable storage medium is provided. The computer-readable storage medium stores a computer program that causes a computer to perform the method according to the above first or second aspect.

In a ninth aspect, a computer program product is provided. The computer program product includes computer program instructions that cause a computer to perform the method according to the above first or second aspect.

In a tenth aspect, a computer program is provided. The computer program, when executed on a computer, causes the computer to perform the method according to the above first or second aspect.

With the above technical solutions, the network device can notify the terminal device of first information corresponding to a first time period in a message, such that the terminal device can obtain time domain and/or frequency domain synchronization within the corresponding first time period according to the first information. That is, the terminal device only needs to receive one message carrying the first information transmitted by the network device within the first time period, and can obtain time domain and/or frequency domain synchronization at any time within the first time period, thereby ensuring normal communication between the terminal device and the network device. In addition, by avoiding frequent reading of system messages, the effect of saving power consumption of the terminal device can be achieved.

DESCRIPTION OF EMBODIMENTS

Figure 1A:
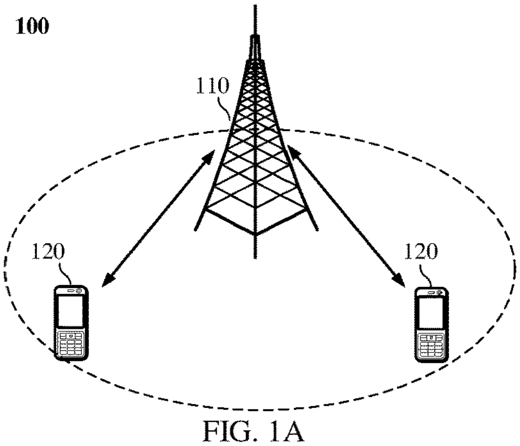
FIGS. 1A-1C are schematic diagrams each showing an application scenario according to an embodiment of the present disclosure.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the $5^{th}$ Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

In some embodiments, the communication system of an embodiment of the present disclosure may be applied to a Carrier Aggregation (CA) scenario, a Dual Connectivity (DC) scenario, a Standalone (SA) network deployment scenario, and the like.

In some embodiments, the communication system of an embodiment of the present disclosure may be applied to unlicensed spectrum or shared spectrum. Alternatively, the communication system of an embodiment of the present disclosure may be applied to licensed spectrum or non-shared spectrum.

In some embodiments, the communication system in the embodiment of the present disclosure can be applied to the FR1 frequency band (corresponding to the frequency range from 410 MHz to 7.125 GHz), or can be applied to the FR2 frequency band (corresponding to the frequency range from 24.25 GHz to 52.6 GHz), or can be applied to a new frequency band, e.g., a high-frequency frequency band corresponding to the frequency range from 52.6 GHz to 71 GHz.

In some embodiments, the embodiments of the present disclosure may be applied to a Non-Terrestrial Network (NTN) system or a Terrestrial Network (TN) system.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device. The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Common Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a wireless terminal device in self driving, a wireless terminal device in remote medical, a wireless terminal device in smart grid, a wireless terminal device in transportation safety, a wireless terminal device in smart city, or a wireless terminal device in smart home. The terminal device in the embodiments of the present disclosure may also be referred to as terminal, User Equipment (UE), access terminal device, vehicle-mounted terminal, industrial control terminal, UE unit, UE station, mobile station, remote station, remote terminal device, mobile device, UE terminal device, wireless communication device, UE agent, or UE device, etc. The terminal device can also be fixed or mobile.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Exemplarily, FIG. 1A is a schematic diagram showing an architecture of a communication system 100 according to an embodiment of the present disclosure. A shown in FIG. 1A, the communication system 100 may include a network device 110 which may be a device communicating with a terminal device 120 (or referred to as communication terminal or terminal). The network device 110 may provide communication coverage for a particular geographic area, and may communicate with terminal devices located within the coverage.

FIG. 1A exemplarily shows one network device and two terminal devices. Optionally, the communication system 100 may include multiple network devices, and the coverage of each network device may include other numbers of terminal devices. The embodiment of the present disclosure is not limited to this.

Figure 1B:
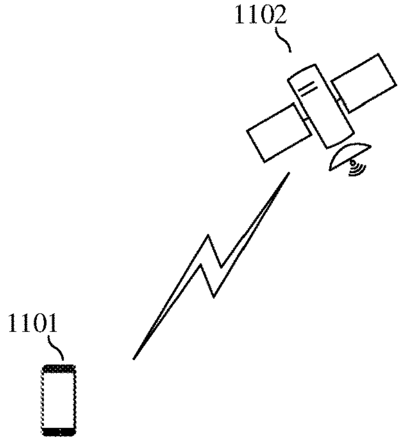

Exemplarily, FIG. 1B is a schematic diagram showing an architecture of another communication system according to an embodiment of the present disclosure. Referring to FIG. 1B, a terminal device 1101 and a satellite 1102 are included, and wireless communication can be performed between the terminal device 1101 and the satellite 1102. The network formed between the terminal device 1101 and the satellite 1102 may also be referred to as an NTN. In the architecture of the communication system shown in FIG. 1B, the satellite 1102 may function as a base station, and the terminal device 1101 and the satellite 1102 may communicate with each other directly. In this system architecture, the satellite 1102 can be referred to as a network device. Optionally, the communication system may include multiple network devices 1102, and the coverage of each network device 1102 may include a different number of terminal devices, and the embodiment of the present disclosure is not limited to this.

Figure 1C:
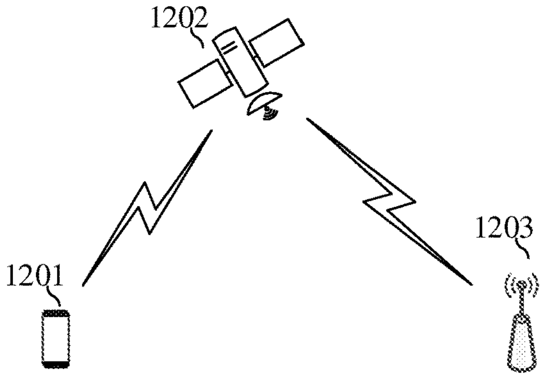

Exemplarily, FIG. 1C is a schematic diagram showing an architecture of yet another communication system according to an embodiment of the present disclosure. Referring to FIG. 1C, a terminal device 1201, a satellite 1202, and a base station 1203 are included, wireless communication can be performed between the terminal device 1201 and the satellite 1202, and communication can be performed between the satellite 1202 and the base station 1203. The network formed among the terminal device 1201, the satellite 1202, and the base station 1203 may also be referred to as an NTN. In the architecture of the communication system shown in FIG. 1C, the satellite 1202 may not have the function of a base station, and the communication between the terminal device 1201 and the base station 1203 needs to be relayed via the satellite 1202. In this system architecture, the base station 1203 may be referred to as a network device. Optionally, the communication system may include multiple network devices 1203, and the coverage of each network device 1203 may include a different number of terminal devices, and the embodiment of the present disclosure is not limited to this.

It should be noted that FIG. 1A to FIG. 1C are only illustrations of systems where the present disclosure can be applied. Of course, the methods shown in the embodiments of the present disclosure can also be applied to other systems, e.g., 5G communication systems, LTE communication systems, etc., and the embodiment of the present disclosure is not limited to this.

Optionally, the wireless communication system shown in FIGS. 1A-1C may also include other network entities such as a Mobility Management Entity (MME) or an Access and Mobility Management Function (AMF). The embodiment of the present disclosure is not limited to this.

It can be appreciated that, in the embodiments of the present disclosure, a device having a communication function in a network/system may be referred to as a communication device. Taking the communication system 100 shown in FIG. 1A as an example, the communication devices may include the network device 110 and the terminal device 120 with communication functions. The network device 110 and the terminal device 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the embodiments of the present disclosure, "configuration" may be done by a network device transmitting indication information to a terminal device.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

In the embodiments of the present disclosure, "predefined" or "preconfigured" may implemented as pre-stored in one or more devices (for example, including a terminal device and a network device) corresponding codes, tables or other means that can be used to indicate related information, and the present disclosure is not limited to its specific implementation. For example, "predefined" may refer to defined in protocols.

In the embodiments of the present disclosure, "protocols" may refer to standard protocols in the communication field, including e.g., the LTE protocol, the NR protocol, and related protocols applied in future communication systems. The present disclosure is not limited to any of these examples.

In order to facilitate better understanding of the embodiments of the present disclosure, the NTN related to the present disclosure will be described.

Generally, the NTN provides communication services to terrestrial users by means of satellite communication. Compared with terrestrial cellular network communication, the satellite communication has many unique advantages. First of all, satellite communication is not limited by the user's geographical area. For example, typical terrestrial communication cannot cover areas such as oceans, mountains, deserts, etc., where communication infrastructure cannot be set up or communication coverage cannot be provided due to sparse population. For satellite communication, since a single satellite can cover a large ground area, and satellites can orbit around the earth, theoretically every corner of the earth can be covered by satellite communication. Secondly, satellite communication has a significant social value. Satellite communication can provide coverage at low cost in remote mountainous areas and poor and undeveloped countries or regions, such that people in these regions can enjoy advanced voice communication and mobile internet technologies, which is conducive to narrowing the digital divide between these regions and developed regions and promoting development in these regions. Thirdly, the satellite communication has a long range, and the communication cost does not increase significantly when the communication range increases. Finally, the satellite communication has high stability and is not limited by natural disasters.

According to different orbital heights, communication satellites are divided into Low-Earth Orbit (LEO) satellites, Medium-Earth Orbit (MEO) satellites, Geostationary Earth Orbit (GEO) satellites, High Elliptical Orbit (HEO) satellites, etc.

LEO satellites have a height range of 500 km to 1500 km, and the corresponding orbital period is about 1.5 hours to 2 hours. The signal propagation delay of single-hop communication between users is generally lower than 20 ms. The maximum satellite visible time is 20 minutes. The signal propagation distance is short, the link loss is low, and the transmit power requirements of user terminals are not high.

GEO satellites have an orbit height of 35786 km and revolve around the earth at a period of 24 hours. The signal propagation delay of single-hop communication between users is generally 250 ms.

In order to ensure the satellite coverage and improve the system capacity of the entire satellite communication system, satellites use multiple beams to cover the ground area. A satellite can form dozens or even hundreds of beams to cover the ground area. A satellite beam can cover a ground area having a diameter of tens to hundreds of kilometers.

In order to facilitate better understanding of the embodiments of the present disclosure, the timing relationship in the NR-NTN system related to the present disclosure will be described.

In terrestrial communication systems, the propagation delay of signal communication is typically lower than 1 ms. In the NR-NTN system, due to the long communication distance between the terminal device and the satellite (or network device), the propagation delay of signal communication is very high, ranging from tens of milliseconds to hundreds of milliseconds, depending on the satellite orbit height and the service type of satellite communication. In order to deal with relatively high propagation delays, the timing relationship in the NR-NTN system needs to be enhanced when compared with the NR system.

Figure 2:
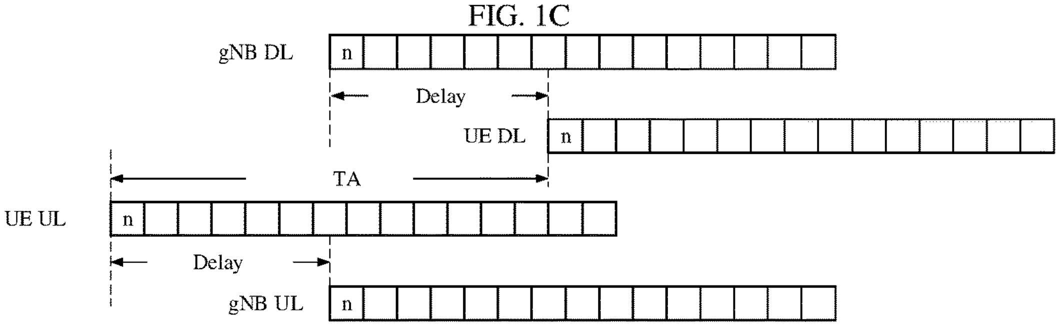
FIG. 2 is a schematic diagram showing a timing relationship in an NTN system according to the present disclosure.
Figure 3:
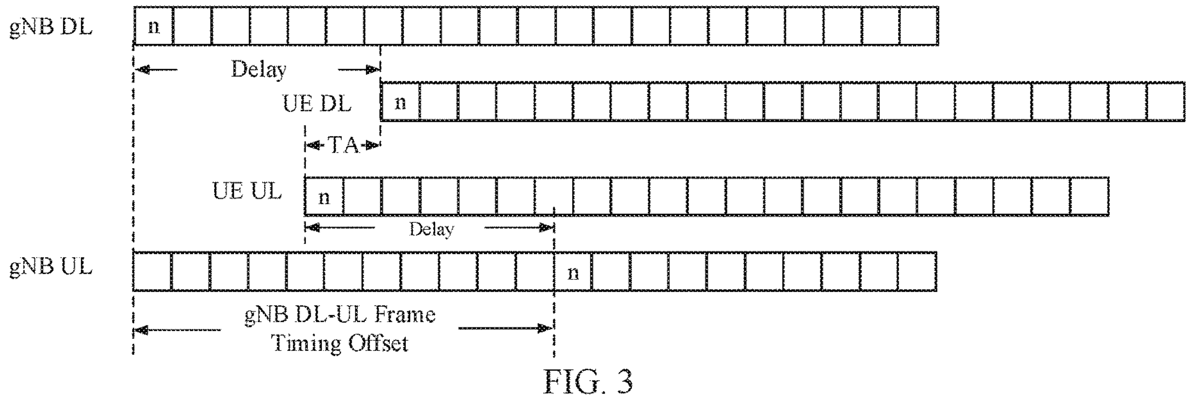
FIG. 3 is a schematic diagram showing a timing relationship in another NTN system according to the present disclosure.

In the NTN system (such as NR-NTN system or Internet of Things NTN (IoT-NTN) system), like the NR system, the UE needs to consider the impact of Timing Advance (TA) when performing uplink transmission. Since the propagation delay in the system is relatively high, the range of the TA value is also relatively large. When the UE is scheduled to perform uplink transmission in time unit (such as time slot or subframe) n, the UE considers the round-trip propagation delay and transmits in advance in the uplink transmission, such that the signal arrives at the network device in uplink time unit n at the network device. Specifically, the timing relationship in the NTN system may include two cases, as shown in FIG. 2 and FIG. 3 below, respectively.

Case 1: As shown in FIG. 2, the downlink (DL) time unit and the uplink (UL) time unit at the network device are aligned. Accordingly, in order to make the uplink transmission from the UE arriving at the network device be aligned with the uplink time unit at the network device, the UE needs to use a large TA value. In some cases, the TA value corresponds to an offset value Koffset.

Case 2: As shown in FIG. 3, there is an offset value between the downlink time unit and the uplink time unit at the network device. In this case, in order to make the uplink transmission from the UE arriving at the network device be aligned with the uplink time unit of the network device, the UE only needs to use a small TA value. In some cases, the TA value corresponds to an offset value Koffset. In other cases, the RTT of the UE corresponds to the offset value Koffset.

In order to facilitate better understanding of the embodiments of the present disclosure, the ephemeris information in the NTN system related to the present disclosure will be described.

Ephemeris information of a satellite includes the satellite's position, velocity and time state (Position Velocity Time, or PVT) vector information. The terminal device obtains the PVT vector information of the satellite according to the ephemeris information format transmitted by the network device. Specifically, the ephemeris information format transmitted by the network device may include the following two schemes:

Scheme 1: Ephemeris Information Format Based on Orbit Information

In Scheme 1, the network device broadcasts ephemeris parameters (α (km), e, I (deg), Ω (deg), ω (deg), M (deg)) at time t0 (for example, time point t0).

Figure 4:
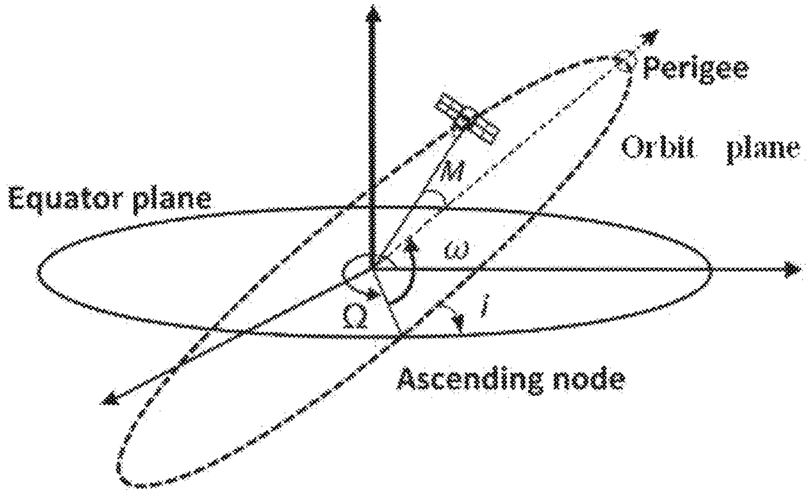
FIG. 4 is a schematic diagram showing ephemeris information according to the present disclosure.

Here, α represents a major radius (Semi-major) in units of meters), e represents an eccentricity, ω represents an argument of periapsis in units of rads (radian angle), Ω represents a longitude of ascending node in units of rads, i represents an inclination in units of rads, M represents a mean anomaly M at epoch time t0 in units of rads, as shown in FIG. 4.

In some cases, the terminal device can obtain the satellite's PVT vector based on an Earth-Centered, Earth-Fixed (ECEF) coordinate system (also referred to as geocentric coordinate system) at time t0 based on the received ephemeris parameters at time t0. The terminal device can obtain the satellite's PVT vector based on the geocentric coordinate system at time t according to the satellite's PVT vector based on the geocentric coordinate system at time t0.

Alternatively, in some other cases, the terminal device obtains the ephemeris parameters of the satellite at time t according to the received ephemeris parameters of the satellite at time t0. Then the terminal device can obtain the satellite's PVT vector based on the geocentric coordinate system at time t according to the ephemeris parameters of the satellite at time t.

The PVT vector based on the geocentric coordinate system includes ($S_X$, $S_Y$, $S_Z$, $V_X$, $V_Y$, $V_Z$), where ($S_X$, $S_Y$, $S_Z$) corresponds to the satellite position, and ($V_X$, $V_Y$, $V_Z$) corresponds to the satellite velocity.

As an example, in Scheme 1, the ephemeris information format notified by the network device is shown in Table 1 below.

TABLE 1

| Epoch time $t_o$ | α (km) | e | I (deg) | Ω (deg) | ω (deg) | M (deg) |
|---|---|---|---|---|---|---|
| 2021 Jan. 1-00:00:00.000 | 6919.955143 | 0.001650732 | 97.574021193 | 36.126537772 | 64.902440674 | 295.175021671 |
| 2021 Jan. 1-00:00:01.000 | 6919.951705 | 0.001651935 | 97.574022789 | 36.126537826 | 64.940253179 | 295.200230115 |
| 2021 Jan. 1-00:00:02.000 | 6919.948274 | 0.001653137 | 97.574024401 | 36.126537882 | 64.978022032 | 295.225482138 |

As another example, accordingly, the PVT vector obtained by the terminal device is shown in Table 2 below.

TABLE 2

| Epoch time $t_o$ | $S_X$ (km) | $S_Y$ (km) | $S_Z$ (km) | $V_X$ (km/s) | $V_Y$ (km/s) | $V_Z$ (km/s) |
|---|---|---|---|---|---|---|
| 2021 Jan. 1-00:00:00.000 | 5584.564377 | 4078.146732 | −11.231645 | 0.591075179 | −0.807929297 | 7.528623249 |
| 2021 Jan. 1-00:00:01.000 | 5585.151982 | 4077.336215 | −3.702637 | 0.584333173 | −0.812851898 | 7.528630518 |
| 2021 Jan. 1-00:00:02.000 | 5585.732846 | 4076.520777 | 3.826369 | 0.577590439 | −0.817773537 | 7.528628699 |

It should be noted that the epoch time to in Table 1 and Table 2 above may be absolute time or absolute time point.

Scheme 2: Ephemeris Information Format Based on Instantaneous State Vector, such as the PVT Vector of the Satellite at Specific Time Point In this scheme, the network device broadcasts the satellite's PVT vector ($S_X$, $S_Y$, $S_Z$, $V_X$, $V_Y$, $V_Z$) based on the geocentric coordinate system at time t0 to the terminal device. It should be understood that an example of the ephemeris information format notified by the network device in this scheme may also be shown in Table 2. The terminal device obtains the satellite's PVT vector based on the geocentric coordinate system at time t according to the satellite's PVT vector based on the geocentric coordinate system at time t0.

In the above two schemes, for notification of the ephemeris information of the satellite at time t0, the information at time t0 can be obtained implicitly from the downlink subframe in which the ephemeris information is received. In addition, the notification method in Scheme 1 has lower overhead than Scheme 2. However, in Scheme 1, the terminal device needs to estimate the PVT vector of the satellite by means of modeling, and thus the accuracy is worse than that in Scheme 2.

In order to facilitate better understanding of the embodiments of the present disclosure, the timing adjustment in the NTN system related to the present disclosure will be described.

In the NTN system, the network device needs to transmit to the terminal device synchronization assistance information such as ephemeris information (satellite velocity and/or satellite position), reference point position, common timing value (such as the timing value between the network device and the reference point, and/or the timing value between the network device and the satellite, and/or the timing value between the satellite and the reference point), timestamp, and the like, for the terminal device to complete the time domain and/or frequency domain synchronization. Accordingly, the terminal device needs to obtain the synchronization assistance information transmitted by the network device, and at the same time complete the corresponding time domain and/or frequency domain synchronization according to its own GNSS capability. The terminal device should obtain at least one of the following information based on its GNSS capability: the position of the terminal device, the time reference or the frequency reference. Based on the above information, as well as the synchronization assistance information indicated by the network device (such as ephemeris information or timestamp of the serving satellite), the terminal device can calculate the timing and/or frequency offset, and apply the timing advance compensation and/or frequency offset adjustment in the idle state or the inactive state or the connected state.

In some cases, the terminal device can calculate the TA value according to Equation (1) below, and perform uplink channel or uplink signal transmission according to the determined TA.

$$T_{TA}=(N_{TA}+N_{TA,UE\text{-}specific}+N_{TA,offset}+N_{TA,common})*Tc \quad (1),$$

where $N_{TA,UE\text{-}specific}$ can be the TA value estimated by the terminal device itself, $N_{TA,offset}$ is the same as the existing protocol e.g., is determined according to the frequency band where the network is deployed and the coexistence of LTE or NR, $N_{TA,common}$ includes the common timing value broadcasted by the network device, $N_{TA}$ can be the TA value indicated by the network device (the value of $N_{TA}$ is 0) when the uplink channel includes PRACH or MsgA transmission, Tc represents the sampling time interval unit, and Tc=1/(480*1000*4096).

In the above Equation (1) for determining $T_{TA}$, $N_{TA}$, common may also change over time. Therefore, the determination of the value of $N_{TA,common}$ may include the following two schemes:

Scheme 1: First-order approximation. The network device needs to broadcast the offset rate of the common timing value, as shown in Equation (2).

$$N_{TA,Commom(t)} = N_{TA,commom_{t0}}, + TA_{Commondrift,t,0} \times (t - t0 + \delta_{t0}), \quad (2)$$

where $N_{TA,common,t0}$ represents the value of $N_{TA,common}$ at time t0, $TA_{Commondrift,t0}$ represents the offset rate of the common timing value corresponding to time t0, and represents the one-way propagation delay from the network device to the terminal device at time t0 of the terminal device.

Scheme 2: Second-order approximation. The network device needs to broadcast the offset rate of the common timing value and the rate of change of the offset rate of the common timing value, as shown in Equation (3).

$$N_{TA,Common}(t) = N_{TA,common_{t0}} + TA_{Commondrift,t0} \times (t - t0 + \delta_{t0}) + \frac{1}{2} TA_{Commondrif\_variation\_rate,t0} \times (t - t0 + \delta_{t0})^2, \quad (3)$$

where $N_{TA,common,t0}$ represents the value of $N_{TA,common}$ at time t0, $TA_{commondrift,t0}$ represents the offset rate of the common timing value corresponding to time t0, $TA_{Commondrift\_variation\_rate,t0}$ represents the rate of change of the offset rate of the common timing value corresponding to time t0, and represents the one-way propagation delay from the network device to the terminal device at time t0 of the terminal device.

In order to facilitate better understanding of the embodiments of the present disclosure, problems in the related art will be described.

Figure 5:
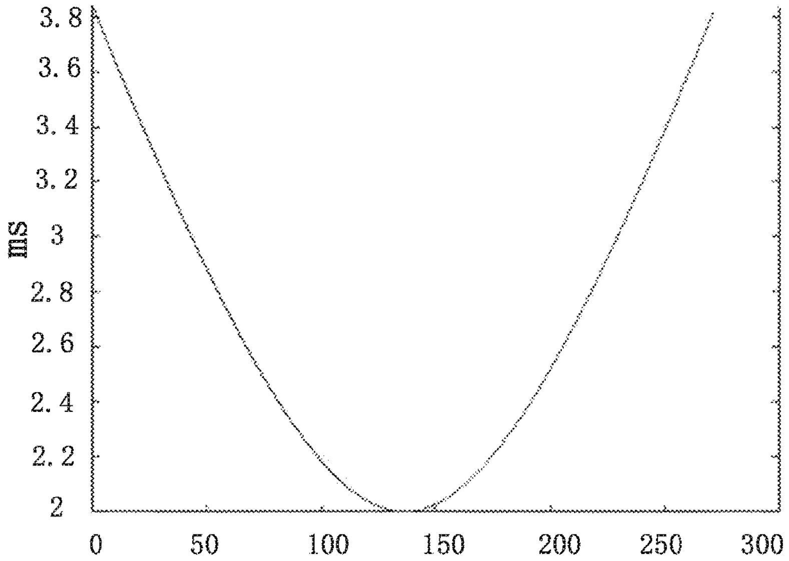
FIG. 5 is a schematic diagram showing a common timing value changing over time in a satellite scenario according to the present disclosure.
Figure 6:
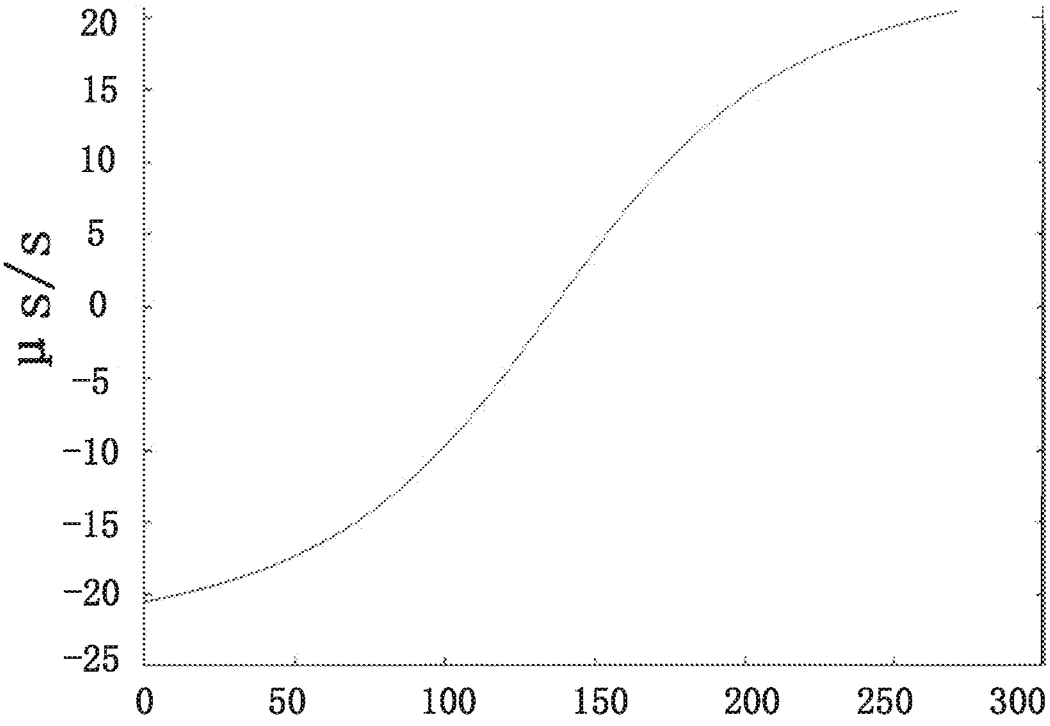
FIG. 6 is a schematic diagram showing an offset rate of a common timing value changing over time in a satellite scenario according to the present disclosure.
Figure 7:
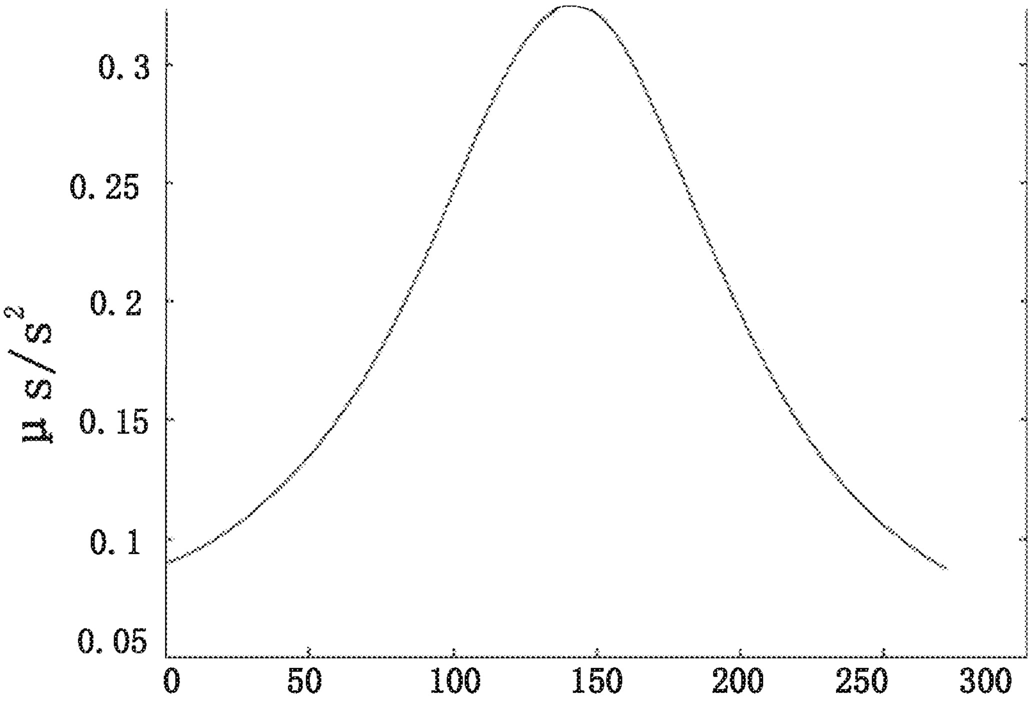
FIG. 7 is a schematic diagram showing a rate of change of an offset rate of a common timing value changing over time in a satellite scenario according to the present disclosure.

In the related art, the network device needs to broadcast the common timing value, and may also need to broadcast the offset rate of the common timing value and/or the rate of change of the offset rate of the common timing value. FIG. 5 is a schematic diagram showing a common timing value (in units of ms) changing over time in a satellite scenario. FIG. 6 is a schematic diagram showing an offset rate of a common timing value (the middle figure, in units of μs/s) changing over time in a satellite scenario. FIG. 7 is a schematic diagram showing a rate of change of an offset rate of a common timing value (the right figure, in units of $\mu s/s^2$) changing over time in a satellite scenario. Since the common timing value, the offset rate of the common timing value, and the rate of change of the offset rate of the common timing value change over time, the network device needs to notify the information frequently, e.g., via system messages, and accordingly, the terminal device needs to read system messages frequently to obtain updates of the information, which leads to high power consumption of the terminal device. How to notify the information more efficiently is a problem to be solved.

In view of the above problems, the present disclosure provides a time-frequency synchronization solution. The network device can notify the terminal device of first information corresponding to a first time period in a message, such that the terminal device can obtain time domain and/or frequency domain synchronization within the corresponding first time period according to the first information. That is, the terminal device only needs to receive one message carrying the first information transmitted by the network device within the first time period, and can obtain time domain and/or frequency domain synchronization at any time within the first time period, thereby ensuring normal communication between the terminal device and the network device. In addition, by avoiding frequent reading of system messages, the effect of saving power consumption of the terminal device can be achieved.

The technical solutions of the present disclosure will be described in detail below with reference to specific embodiments.

Figure 8:
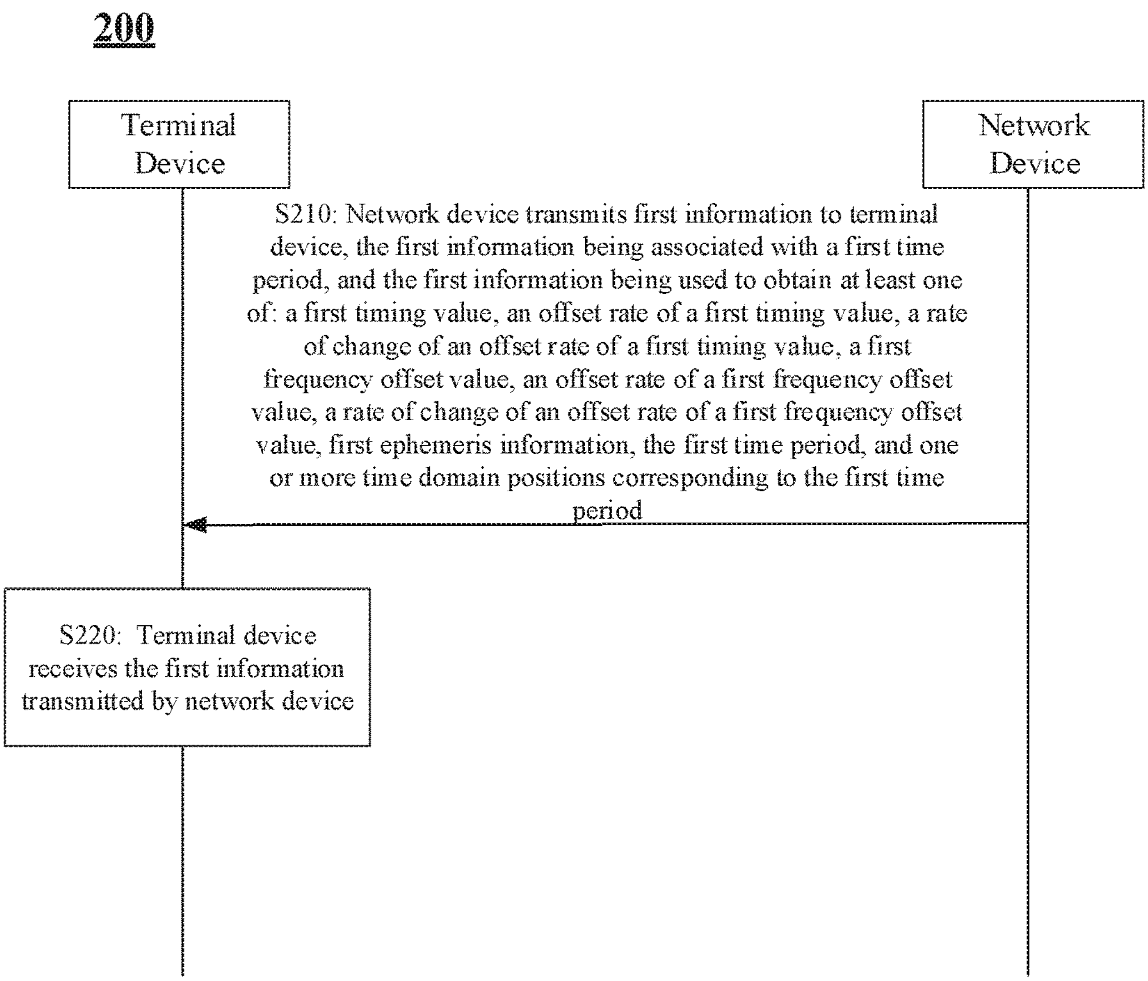
FIG. 8 is a schematic flowchart illustrating a wireless communication method according to an embodiment of the present disclosure.

FIG. 8 is a schematic flowchart illustrating a wireless communication method 200 according to an embodiment of the present disclosure. As shown in FIG. 8, the wireless communication method 200 may include at least part of the following content.

At S210, a network device transmits first information to a terminal device. The first information is associated with a first time period, and the first information is used to obtain at least one of: a first timing value, an offset rate of a first timing value, a rate of change of an offset rate of a first timing value, a first frequency offset value, an offset rate of a first frequency offset value, a rate of change of an offset rate of a first frequency offset value, first ephemeris information, the first time period, or one or more time domain positions corresponding to the first time period.

At S220, the terminal device receives the first information transmitted by the network device.

The "used to obtain" as used in the embodiments of the present disclosure may include directly obtaining or indirectly obtaining, and may also be explicitly indicating or implicitly indicating. For example, in Example 1, "A is used to obtain B" may include: "A is used to directly obtain B", for example, A includes B. In Example 2, "A is used to obtain B" may include: "A is used to indirectly obtain B", for example, A includes C, and C is used to indicate B. In Example 3, "A is used to obtain B" may include: "A explicitly indicates B". In Example 4, "A is used to obtain B" may include: "A implicitly indicates B".

In some embodiments, the first information being used to obtain at least one of the first timing value, the offset rate of the first timing value, the rate of change of the offset rate of the first timing value, the first frequency offset value, the offset rate of the first frequency offset value, the rate of change of the offset rate of the first frequency offset value, the first ephemeris information, the first time period, or the one or more time domain positions corresponding to the first time period may include: the first information indicating at least one of the first timing value, the offset rate of the first timing value, the rate of change of the offset rate of the first timing value, the first frequency offset value, the offset rate of the first frequency offset value, the rate of change of the offset rate of the first frequency offset value, the first ephemeris information, the first time period, or the one or more time domain positions corresponding to the first time period.

In some embodiments, the first information being used to obtain at least one of the first timing value, the offset rate of the first timing value, the rate of change of the offset rate of the first timing value, the first frequency offset value, the offset rate of the first frequency offset value, the rate of change of the offset rate of the first frequency offset value, the first ephemeris information, the first time period, or the one or more time domain positions corresponding to the first time period may include: the first information including at least one of the first timing value, the offset rate of the first timing value, the rate of change of the offset rate of the first timing value, the first frequency offset value, the offset rate of the first frequency offset value, the rate of change of the offset rate of the first frequency offset value, the first ephemeris information, the first time period, or the one or more time domain positions corresponding to the first time period.

In some embodiments, the terminal device may obtain time domain and/or frequency domain synchronization corresponding to at least one time corresponding to the first time period according to the first information. Further, the terminal device may obtain time domain and/or frequency domain synchronization corresponding to any time corresponding to the first time period according to the first information.

In the embodiment of the present disclosure, the network device can notify the terminal device of first information associated with a first time period in a message, such that the terminal device can obtain time domain and/or frequency domain synchronization within the corresponding first time period according to the first information. That is, the terminal device only needs to receive one message carrying the first information transmitted by the network device within the first time period, and can obtain time domain and/or frequency domain synchronization at any time within the first time period, thereby ensuring normal communication between the terminal device and the network device. In addition, by avoiding frequent reading of system messages, the effect of saving power consumption of the terminal device can be achieved.

In some embodiments, the embodiments of the present disclosure may be applied to an NTN network. Certainly, the embodiments of the present disclosure may also be applied to other networks, and the present disclosure is not limited to this.

In some embodiments, the first timing value may be a common timing value.

In some embodiments, the offset rate of the first timing value may be an offset rate of the common timing value.

In some embodiments, the rate of change of the offset rate of the first timing value may be a rate of change of the offset rate of the common timing value.

In some embodiments, the first frequency offset value may be a common frequency offset value.

In some embodiments, the offset rate of the first frequency offset value is an offset rate of the common frequency offset value.

In some embodiments, the rate of change of the offset rate of the first frequency offset value may be a rate of change of the offset rate of the common frequency offset value.

In some embodiments, a format of the first ephemeris information may be the above format of ephemeris information based on orbit information, or the above format of ephemeris information based on instantaneous state vector.

In some embodiments, the offset rate of the first timing value may include an offset rate associated with the first timing value, and the rate of change of the offset rate of the first timing value may include a rate of change of the offset rate associated with the first timing value. The offset rate of the first frequency offset value may include an offset rate associated with the first frequency offset value, and the rate of change of the offset rate of the first frequency offset value may include a rate of change of the offset rate associated with the first frequency offset value.

In some embodiments, the first information may be associated with at least one of: time information, an ephemeris information format, ephemeris information, a group identifier, a reference signal index (such as Synchronization Signal Block (SSB) index or Channel State Information Reference Signal (CSI-RS) index), a cell identifier, an antenna polarization mode, a satellite identifier, a serving satellite, a service time length of the serving satellite, a satellite to serve, time at which the satellite to serve starts to serve, a satellite to stop serving, or time at which the satellite to stop serving stops serving.

In some embodiments, the first information being associated with the first time period may include: the first information being associated with M time domain positions included in the first time period, where M is a positive integer greater than or equal to 1.

In some embodiments, each of the M time domain positions may be a time point or a time period, and the present disclosure is not limited to this.

In some embodiments, the M time domain positions may be absolute time (for example, Universal Time Coordinated (UTC) time), or relative time (for example, the first time domain position among the M time domain positions position is 0).

Specifically, for example, the first information being associated with M time domain positions corresponding to the first time period, or the first information being associated with M time domain positions within the first time period, may include: the first information being associated with M time points corresponding to the first time period, or the first information being associated with M time points within the first time period. The term "time domain position" in the embodiments of the present disclosure may be replaced with "time point", or similar expressions, and the present disclosure is not limited to this.

In some embodiments, the first information may be used to obtain at least one of: a first timing value corresponding to each of one or more of the M time domain positions, an offset rate of a first timing value corresponding to each of one or more of the M time domain positions, a rate of change of an offset rate of a first timing value corresponding to each of one or more of the M time domain positions, a first frequency offset value corresponding to each of one or more of the M time domain positions, an offset rate of a first frequency offset value corresponding to each of one or more of the M time domain positions, or a rate of change of an offset rate of a first frequency offset value corresponding to each of one or more of the M time domain positions.

In some embodiments, the first information may include at least one of: a first timing value corresponding to each of one or more of the M time domain positions, an offset rate of a first timing value corresponding to each of one or more of the M time domain positions, a rate of change of an offset rate of a first timing value corresponding to each of one or more of the M time domain positions, a first frequency offset value corresponding to each of one or more of the M time domain positions, an offset rate of a first frequency offset value corresponding to each of one or more of the M time domain positions, or a rate of change of an offset rate of a first frequency offset value corresponding to each of one or more of the M time domain positions.

In some embodiments, the first information may indicate at least one of: a first timing value corresponding to each of one or more of the M time domain positions, an offset rate of a first timing value corresponding to each of one or more of the M time domain positions, a rate of change of an offset rate of a first timing value corresponding to each of one or more of the M time domain positions, a first frequency offset value corresponding to each of one or more of the M time domain positions, an offset rate of a first frequency offset value corresponding to each of one or more of the M time domain positions, or a rate of change of an offset rate of a first frequency offset value corresponding to each of one or more of the M time domain positions.

In some embodiments, the terminal device may obtain first timing values corresponding to the M time domain positions according to the first information.

In Example 1, the first information may be used to obtain a first timing value corresponding to each of the M time domain positions. That is, in Example 1, M is greater than 1.

For example, the first information being used to obtain the first timing value corresponding to each of the M time domain positions may include: the first information indicating the first timing value corresponding to each of the M time domain positions.

In another example, the first information being used to obtain the first timing value corresponding to each of the M time domain positions may include: the first information including the first timing value corresponding to each of the M time domain positions.

In some implementations of Example 1, the first information may include a plurality of first timing values corresponding to a plurality of different time domain positions, as shown in Table 3 below.

TABLE 3

| Time domain position | First timing value |
| --- | --- |
| t0 | First timing value 0 |
| t1 | First timing value 1 |
| t2 | First timing value 2 |
| . . . | . . . |
| tn | First timing value n |

Specifically, the respective first timing values corresponding to the M time domain positions may be obtained according to the above Table 3, where M is part or all of the time domain positions {t0, t1, . . . , tn}.

In Example 2, the first information may be used to obtain a first timing value corresponding to each of at least one of the M time domain positions and an offset rate of a first timing value corresponding to each of at least one of the M time domain positions.

For example, the first information being used to obtain the first timing value corresponding to each of at least one of the M time domain positions and the offset rate of the first timing value corresponding to each of at least one of the M time domain positions may include: the first information including the first timing value corresponding to each of at least one of the M time domain positions and the offset rate of the first timing value corresponding to each of at least one of the M time domain positions.

In another example, the first information being used to obtain the first timing value corresponding to each of at least one of the M time domain positions and the offset rate of the first timing value corresponding to each of at least one of the M time domain positions may include: the first information indicating the first timing value corresponding to each of at least one of the M time domain positions and the offset rate of the first timing value corresponding to each of at least one of the M time domain positions.

In some implementations of Example 2, the first information may be used to obtain a first timing value corresponding to a first time domain position among the M time domain positions, and used to obtain an offset rate of a first timing value corresponding to each of at least two of the M time domain positions.

In some implementations of Example 2, the first information may include a first timing value corresponding to a time domain position t0, and offset rates of first timing values corresponding to time domain positions from t0 to tn, as shown in Table 4 below.

TABLE 4

| Time Domain Position | First Timing Value | Offset Rate of First Timing Value |
| --- | --- | --- |
| t0 | First Timing Value 0 | Offset Rate 0 |
| t1 | | Offset Rate 1 |
| t2 | | Offset Rate 2 |
| . . . | | . . . |
| tn | | Offset Rate n |

In some implementations of Example 2, the terminal device may determine the first timing value corresponding to each of the M time domain positions according to:

$$N_{TA_i} = N_{TA_{i-1}} + D_{i-1} \times (t_i - t_{i-1}), \text{ or} \tag{4}$$

$$N_{TA_i} = N_{TA_{i-1}} + D_{i-1} \times \left(t_i - t_{i-1} + \delta_{t_0}\right), \tag{5}$$

where $t_i$ represents an (i+1)-th time domain position among the M time domain positions, i=1, 2 . . . , M−1, $t_0$ represents a first time domain position among the M time domain positions, $N_{TA_{i-1}}$ represents the first timing value corresponding to the time domain position $t_{i-1}$, $N_{TA_i}$ represents the first timing value corresponding to the time domain position $t_i$, $D_{i-1}$ represents the offset rate of the first timing value corresponding to $t_{i-1}$, and $\delta_{t_0}$ represents a one-way propagation delay from the network device to the terminal device at the time domain position $t_0$ of the terminal device.

In Example 3, the first information may be used to obtain a first timing value corresponding to each of at least one of the M time domain positions, an offset rate of a first timing value corresponding to each of at least one of the M time domain positions, and a rate of change of an offset rate of a first timing value corresponding to each of at least one of the M time domain positions.

For example, the first information being used to obtain the first timing value corresponding to each of at least one of the M time domain positions, the offset rate of the first timing value corresponding to each of at least one of the M time domain positions, and the rate of change of the offset rate of the first timing value corresponding to each of at least one of the M time domain positions may include: the first information including the first timing value corresponding to each of at least one of the M time domain positions, the offset rate of the first timing value corresponding to each of at least one of the M time domain positions, and the rate of change of the offset rate of the first timing value corresponding to each of at least one of the M time domain positions.

In another example, the first information being used to obtain the first timing value corresponding to each of at least one of the M time domain positions, the offset rate of the first timing value corresponding to each of at least one of the M time domain positions, and the rate of change of the offset rate of the first timing value corresponding to each of at least one of the M time domain positions may include: the first information indicating the first timing value corresponding to each of at least one of the M time domain positions, the offset rate of the first timing value corresponding to each of at least one of the M time domain positions, and the rate of change of the offset rate of the first timing value corresponding to each of at least one of the M time domain positions.

In some implementations of Example 3:

the first information may be used to obtain a first timing value corresponding to a first time domain position among the M time domain positions, an offset rate of a first timing value corresponding to each of at least one of the M time domain positions, and a rate of change of an offset rate of a first timing value corresponding to each of at least two of the M time domain positions; or the first information may be used to obtain a first timing value corresponding to a first time domain position among the M time domain positions, an offset rate of a first timing value corresponding to each of at least two of the M time domain positions, and a rate of change of an offset rate of a first timing value corresponding to each of at least two of the M time domain positions.

In some implementations of Example 3, the first information may include a first timing value corresponding to time t0, and an offset rate of the first timing value corresponding to each of time t0 to time tn, and a rate of change of the offset rate of the first timing value corresponding to each of time t0 to time tn. Table 5 below gives an example.

TABLE 5

| Time | First Timing Value | Offset Rate of First Timing Value | Rate of Change of Offset Rate of First Timing Value |
|---|---|---|---|
| t0 | First Timing Value 0 | Offset Rate 0 | Rate of Change 0 |
| t1 | | Offset Rate 1 | Rate of Change 1 |
| t2 | | Offset Rate 2 | Rate of Change 2 |
| . . . | | . . . | . . . |
| tn | | Offset Rate n | Rate of Change n |

In some implementations of Example 3, the terminal device may determine the first timing value corresponding to each of the M time domain positions according to:

$$N_{TA_i} = N_{TA_{i-1}} + D_{i-1} \times (t_i - t_{i-1}) + \frac{1}{2} V_{i-1} \times (t_i - t_{i-1})^2, \text{ or} \quad (6)$$

$$N_{TA_i} = N_{TA_{i-1}} + D_{i-1} \times (t_i - t_{i-1} + \delta_{t_0}) + \frac{1}{2} V_{i-1} \times (t_i - t_{i-1} + \delta_{t_0})^2, \quad (7)$$

where $t_i$ represents an (i+1)-th time domain position among the M time domain positions, i=1, 2 . . . , M−1, $t_0$ represents a first time domain position among the M time domain positions, $N_{TA_{i-1}}$ represents the first timing value corresponding to the time domain position $t_{i-1}$, $N_{TA_i}$ represents the first timing value corresponding to the time domain position $t_i$, $D_{i-1}$ represents the offset rate of the first timing value corresponding to $t_{i-1}$, $V_{i-1}$ represents the rate of change of the offset rate of the first timing value corresponding to $t_{i-1}$, and $\delta_{t_0}$ represents a one-way propagation delay from the network device to the terminal device at the time domain position $t_0$ of the terminal device.

In some embodiments, the terminal device may determine a first timing value corresponding to a first time domain position according to the first timing values corresponding to the M time domain positions, the first time domain position being a time domain position corresponding to the first time period or a time domain position in the first time period.

In some embodiments, the terminal device may determine the first timing value corresponding to the first time domain position according to Equation (8) or Equation (9) below. In this case, M is greater than 1.

$$N_{TA_t} = N_{TA_{k-1}} + \left(\frac{N_{TA_k} - N_{TA_{k-1}}}{t_k - t_{k-1}}\right) \times (t - t_{k-1}), \quad (8)$$

$$N_{TA_t} = N_{TA_{k-1}} + \left(\frac{N_{TA_k} - N_{TA_{k-1}}}{t_k - t_{k-1}}\right) \times (t - t_{k-1} + \delta_{t_0}), \quad (9)$$

where t represents the first time domain position, $N_{TA_t}$ represents the first timing value corresponding to the first time domain position, $t_{k-1}$ represents a k-th time domain position among the M time domain positions, $N_{TA_{k-1}}$ represents the first timing value corresponding to $t_{k+1}$, $t_k$ represents a (k+1)-th time domain position among the M time domain positions, $N_{TA_k}$ represents the first timing value corresponding to $t_k$, and $\delta_{t_0}$ represents a one-way propagation delay from the network device to the terminal device at the time domain position $t_0$ of the terminal device.

Here, in Equation (8) or Equation (9), the first time domain position is a time domain position between $t_{k-1}$ and $t_k$, or the first time domain position is a time domain position before $t_{k-1}$, or the first time domain position is a time domain position after $t_k$.

In some embodiments, the terminal device may determine the first timing value corresponding to the first time domain position according to:

$$N_{TA_t} = N_{TA_0} + D_0 \times (t - t_0), \text{ or} \tag{10}$$

$$N_{TA_t} = N_{TA_0} + D_0 \times (t - t_0 + \delta_{t_0}), \tag{11}$$

where t represents the first time domain position, $N_{TA_t}$ represents the first timing value corresponding to the first time domain position, $N_{TA_0}$ represents the first timing value corresponding to the time domain position $t_0$, $t_0$ represents the first time domain position among the M time domain positions, $D_0$ represents an offset rate of the first timing value corresponding to $t_0$, and $\delta_{t_0}$ represents a one-way propagation delay from the network device to the terminal device at the time domain position $t_0$ of the terminal device.

Here, in Equation (10) or Equation (11), the first time domain position is a time domain position before $t_0$, or the first time domain position is a time domain position after $t_0$.

In some embodiments, the terminal device may determine the first timing value corresponding to the first time domain position according to:

$$N_{TA_t} = N_{TA_0} + D_0 \times (t - t_0) + \frac{1}{2} V_0 \times (t - t_0)^2, \text{ or} \tag{12}$$

$$N_{TA_t} = N_{TA_0} + D_0 \times (t - t_0 + \delta_{t_0}) + \frac{1}{2} V_0 \times (t - t_0 + \delta_{t_0})^2, \tag{13}$$

wherein t represents the first time domain position, $N_{TA_t}$ represents the first timing value corresponding to the first time domain position, $N_{TA_0}$ represents the first timing value corresponding to the time domain position $t_0$, $t_0$ represents the first time domain position among the M time domain positions, $D_0$ represents an offset rate of the first timing value corresponding to $t_0$, $V_0$ represents a rate of change of the offset rate of the first timing value corresponding to $t_0$, and $\delta_{t_0}$ represents a one-way propagation delay from the network device to the terminal device at the time domain position $t_0$ of the terminal device.

Here, in Equation (12) or Equation (13), the first time domain position is a time domain position before $t_0$, or the first time domain position is a time domain position after $t_0$.

In some embodiments, the terminal device may perform time domain synchronization corresponding to the first time domain position according to the first timing value corresponding to the first time domain position.

In some embodiments, the scheme in which the network device indicates the frequency offset value is similar to the scheme in which the timing value is indicated as described above. For details, reference may be made to the relevant description above about the timing value, and details thereof will be omitted here for brevity.

In some embodiments, the scheme in which the frequency offset value is processed is similar to the scheme in which the timing value is processed as described above. For details, reference may be made to the relevant description above about the timing value, and details thereof will be omitted here for brevity.

In some embodiments, an interval between any two adjacent time domain positions among the M time domain positions may be equal.

In some embodiments, the interval between any two adjacent time domain positions among the M time domain positions may be a first length.

In some embodiments, the first length may be configured by the network device via at least one of a system message, a Radio Resource Control (RRC) message, a Media Access Control Control Element (MAC CE), or Downlink Control Information (DCI); or the first length may be predefined or agreed in a protocol.

In some embodiments, an interval between any two adjacent time domain positions among the M time domain positions may not be equal.

In some embodiments, at least one of the M time domain positions may be associated with a time domain position corresponding to ephemeris information, or at least one of the M time domain positions may be a time domain position among time domain positions corresponding to ephemeris information.

In some embodiments, the ephemeris information may be the first ephemeris information, or the first information may include at least the first ephemeris information.

In some embodiments, each of the M time domain positions may correspond to a respective one of the time domain positions corresponding to the ephemeris information.

For example, the ephemeris information corresponds to M time domain positions, and each of the M time domain positions corresponds to a respective one of the time domain positions corresponding to the ephemeris information.

In another example, the ephemeris information corresponds to 2M time domain positions, then each of the M time domain positions correspond to a respective one of odd-numbered time domain positions among the time domain positions corresponding to the ephemeris information, or each of the M time domain positions correspond to a respective one of even-numbered time domain positions among the time domain positions corresponding to the ephemeris information, or each of the M time domain positions correspond to a respective one of the first M time domain positions corresponding to the ephemeris information, or each of the M time domain positions correspond to one of the last M time domain positions corresponding to the ephemeris information.

In some embodiments, the above ephemeris information may be used to determine position information and/or velocity information of a satellite. For example, the ephemeris information may indicate the position information and/or the velocity information of the satellite. As an example, an ephemeris information format may be an ephemeris information format based on the instantaneous state vector. In another example, the ephemeris information may indicate ephemeris parameters of the satellite (α (km), e, I (deg), Ω (deg), ω (deg), M (deg)), and the terminal device may determine the position information and/or the velocity information of the satellite according to the ephemeris parameters of the satellite. As an example, the ephemeris information format is an ephemeris information format based on the orbit information.

In some embodiments, the ephemeris information format may be the format shown in Table 1.

In some embodiments, the ephemeris information format is the format shown in Table 2.

In some embodiments, the first time period may be associated with a second length, or a length of the first time period may be the second length.

In some embodiments, the second length may be configured by the network device via at least one of a system message, an RRC message, a MAC CE, or DCI; or the second length may be predefined or agreed in a protocol.

In some embodiments, the second length may be determined according to one or more time domain positions corresponding to the first time period; or the second length may be determined according to M time domain positions corresponding to the first time period.

In some embodiments, the first time domain position among the M time domain positions is a start time domain position in the first time period, and/or the last time domain position among the M time domain positions is an end time domain position in the first time period.

In some embodiments, the first information may be configured by the network device via at least one of a system message, an RRC message, or a MAC CE.

For example, the above system message may include an NTN System Information Block (NTN-SIB) message.

For example, the above RRC message may include a handover command transmitted by the network device.

In some embodiments, one NTN-SIB message only includes first information associated with one cell.

In some embodiments, one NTN-SIB message includes first information associated with a plurality of cells. Optionally, the first information of different cells may include same content or different content.

In some embodiments, in different NTN scenarios, content included in the first information may be different.

In some embodiments, the content included in the first information may be determined according to the second information.

In some embodiments, the second information may be configured by the network device via at least one of a system message, an RRC message, or a MAC CE.

In some embodiments, the second information may be used to determine whether a scenario corresponding to the network device is a Geostationary Earth Orbit (GEO) scenario or a non-GEO scenario. The content included in the first information in the GEO scenario is different from the content included in the first information in the non-GEO scenario.

For example, the second information may indicate that the scenario corresponding to the network device is a GEO scene, or indicate that the scenario corresponding to the network device is a non-GEO scene, such as a LEO or MEO scene.

For example, when the scenario corresponding to the network device is a GEO scenario, the first information may not include at least one of: the offset rate of the first timing value, the rate of change of the offset rate of the first timing value, the offset rate of the first frequency offset value, and the rate of change of the offset rate of the first frequency offset value.

In another example, when the scenario corresponding to the network device is a non-GEO scenario, the first information may include at least one of: the offset rate of the first timing value, the rate of change of the offset rate of the first timing value, the offset rate of the first frequency offset value, or the rate of change of the offset rate of the first frequency offset value.

It should be understood that in some cases, since the GEO scenario is a geostationary satellite scenario, there is no need to indicate the offset rate and the rate of change of the offset rate.

Therefore, in the embodiment of the present disclosure, the network device can notify the terminal device of first information corresponding to a first time period in a message, such that the terminal device can obtain time domain and/or frequency domain synchronization within the corresponding first time period according to the first information. That is, the terminal device only needs to receive one message carrying the first information transmitted by the network device within the first time period, and can obtain time domain and/or frequency domain synchronization at any time within the first time period, thereby ensuring normal communication between the terminal device and the network device. In addition, by avoiding frequent reading of system messages, the effect of saving power consumption of the terminal device can be achieved.

As a non-limiting example, the terminal device receives the first information transmitted by the network device, and the first information includes common timing values corresponding to a plurality of time points in the first time period. The start time point in the first time period (indicated by 0) is determined according to a downlink time unit at which the first information is received. For the above FIG. 5, this method is used for quantization and notification, and the first information is shown in Table 6 below.

TABLE 6

Indication of First Timing Value

| Time Point (s) | 0 | 65 | 100 | 135 | 170 | 205 | 270 |
|---|---|---|---|---|---|---|---|
| Common Timing Value (ms) | 3.8 | 2.6 | 2.2 | 2 | 2.2 | 2.6 | 3.8 |

It should be noted that the time points in the above Table 6 may be relative time points.

Figure 9:
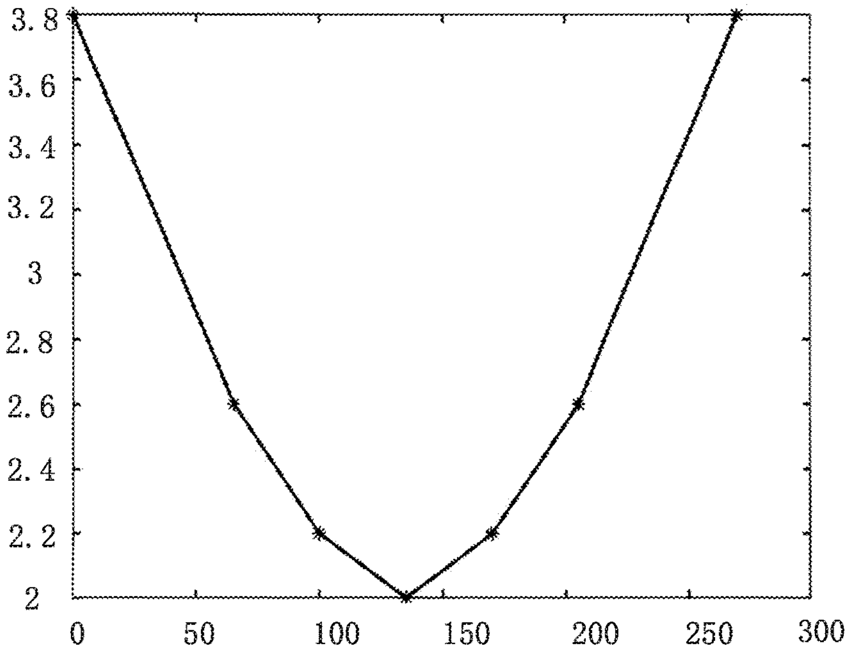
FIG. 9 is a schematic diagram showing a common timing value changing over time in a satellite scenario according to an embodiment of the present disclosure.

In the above example, the terminal device can obtain the common timing value at any time point within the 270 s (that is, the first time period) by interpolation according to Table 6, as shown in FIG. 9. It should be understood that if a higher-precision curve fitting is desired, the network device may perform sampling notification with a denser granularity, and details thereof will be omitted here.

In the above example, the terminal device obtains time domain and/or frequency domain synchronization corresponding to at least one time corresponding to the first time period according to the first information. Further, the terminal device may obtain time domain and/or frequency domain synchronization corresponding to any time corresponding to the first time period according to the first information. For example, the terminal device may obtain time domain and/or frequency domain synchronization at any time pint within the 270 s from the downlink time unit at which the first information is received according to the first information.

As another example, the terminal device receives the first information transmitted by the network device, and the time point associated with the first information may be determined according to the time point associated with the ephemeris information. Table 7 and Table 8 below give two examples of notification formats of the first information, respectively.

TABLE 7

Example 1 of Notification Format of First Information

| t | α (km) | e | I (deg) | Ω (deg) | ω (deg) | M (deg) | First Information |
|---|---|---|---|---|---|---|---|
| $t_o$ | α0 | e0 | I0 | Ω0 | ω0 | M0 | First Information 0 |
| $t_1$ | α1 | e1 | I1 | Ω1 | ω1 | M1 | First Information 1 |
| . . . | . . . | . . . | . . . | . . . | . . . | . . . | . . . |
| $t_n$ | αn | en | In | Ωn | ωn | Mn | First Information n |

TABLE 8

| Example 2 of Notification Format of First Information | | | | | | | |
|---|---|---|---|---|---|---|---|
| t | $S_X$ (km) | $S_Y$ (km) | $S_Z$ (km) | $V_X$ (km/s) | $V_Y$ (km/s) | $V_Z$ (km/s) | First Information |
| $t_o$ | $S_{X0}$ | $S_{Y0}$ | $S_{Z0}$ | $V_{X0}$ | $V_{Y0}$ | $V_{Z0}$ | First Information 0 |
| $t_1$ | $S_{X1}$ | $S_{Y1}$ | $S_{Z1}$ | $V_{X1}$ | $V_{Y1}$ | $V_{Z1}$ | First Information 1 |
| . . . | . . . | . . . | . . . | . . . | . . . | . . . | . . . |
| $t_n$ | $S_{Xn}$ | $S_{Yn}$ | $S_{Zn}$ | $V_{Xn}$ | $V_{Yn}$ | $V_{Zn}$ | First Information n |

In the above example, the terminal device obtains time domain and/or frequency domain synchronization at any time within the first time period corresponding to the time points, for example, t0 to tn, associated with the first information, according to the first information.

It should be noted that, for description of the first information in the above example, reference may be made to the above description of the first information, and for the sake of brevity, details thereof will be omitted here.

The method embodiments of the present disclosure have been described in detail above with reference to FIGS. 8 to 9, and the apparatus embodiments of the present disclosure will be described in detail below with reference to FIG. 10 to FIG. 14. It should be understood that the apparatus embodiments and the method embodiments correspond to each other, and for similar descriptions, reference can be made to the method embodiments.

Figure 10:
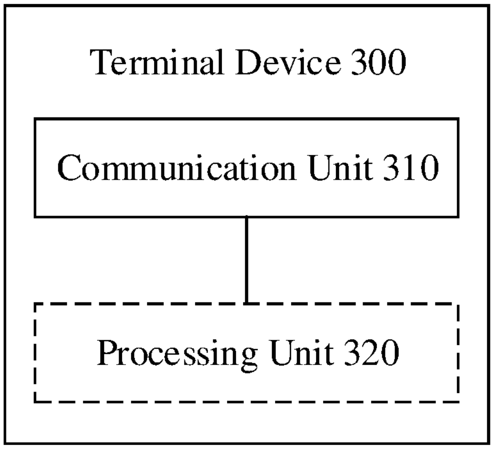
FIG. 10 is a schematic block diagram of a terminal device according to embodiments of the present disclosure.

FIG. 10 shows a schematic block diagram of a terminal device 300 according to an embodiment of the present disclosure. As shown in FIG. 10, the terminal device 300 includes: a communication unit 310 configured to receive first information transmitted by a network device. The first information is associated with a first time period, and the first information is used to obtain at least one of: a first timing value, an offset rate of a first timing value, a rate of change of an offset rate of a first timing value, a first frequency offset value, an offset rate of a first frequency offset value, a rate of change of an offset rate of a first frequency offset value, first ephemeris information, the first time period, or one or more time domain positions corresponding to the first time period.

In some embodiments, the first information being associated with the first time period may include: the first information being associated with M time domain positions included in the first time period, where M is a positive integer greater than or equal to 1.

In some embodiments, the first information may be used to obtain at least one of: a first timing value corresponding to each of one or more of the M time domain positions, an offset rate of a first timing value corresponding to each of one or more of the M time domain positions, a rate of change of an offset rate of a first timing value corresponding to each of one or more of the M time domain positions, a first frequency offset value corresponding to each of one or more of the M time domain positions, an offset rate of a first frequency offset value corresponding to each of one or more of the M time domain positions, or a rate of change of an offset rate of a first frequency offset value corresponding to each of one or more of the M time domain positions.

In some embodiments, the terminal device 300 may further include: a processing unit 320 configured to obtain first timing values corresponding to the M time domain positions according to the first information.

In some embodiments, the first information may be used to obtain a first timing value corresponding to each of the M time domain positions.

In some embodiments, the first information may be used to obtain a first timing value corresponding to each of at least one of the M time domain positions and an offset rate of a first timing value corresponding to each of at least one of the M time domain positions.

In some embodiments, the first information may be used to obtain a first timing value corresponding to a first time domain position among the M time domain positions, and used to obtain an offset rate of a first timing value corresponding to each of at least two of the M time domain positions.

In some embodiments, the processing unit 320 may be configured to: determine the first timing value corresponding to each of the M time domain positions according to:

$$N_{TA_i} = N_{TA_{i-1}} 1 + D_{i-1} \times (t_i - t_{i-1}), \text{ or}$$

$$N_{TA_i} = N_{TA_{i-1}} + D_{i-1} \times \left(t_i - t_{i-1} + \delta_{t_0}\right),$$

where $t_i$ represents an (i+1)-th time domain position among the M time domain positions, i=1, 2 . . . , M−1, $t_0$ represents a first time domain position among the M time domain positions, $N_{TA_{i-1}}$ represents the first timing value corresponding to the time domain position $t_i$, $N_{TA_i}$ represents the first timing value corresponding to the time domain position $t_i$, $D_{i-1}$ represents the offset rate of the first timing value corresponding to $t_{i-1}$, and $\delta_{t_0}$ represents a one-way propagation delay from the network device to the terminal device at the time domain position $t_0$ of the terminal device.

In some embodiments, the first information may be used to obtain a first timing value corresponding to each of at least one of the M time domain positions, an offset rate of a first timing value corresponding to each of at least one of the M time domain positions, and a rate of change of an offset rate of a first timing value corresponding to each of at least one of the M time domain positions.

In some embodiments, the first information may be used to obtain a first timing value corresponding to a first time domain position among the M time domain positions, an offset rate of a first timing value corresponding to each of at least one of the M time domain positions, and a rate of change of an offset rate of a first timing value corresponding to each of at least two of the M time domain positions; or the first information may be used to obtain a first timing value corresponding to a first time domain position among the M time domain positions, an offset rate of a first timing value corresponding to each of at least two of the M time domain positions, and a rate of change of an offset rate of a first timing value corresponding to each of at least two of the M time domain positions.

In some embodiments, the processing unit 320 may be configured to: determine the first timing value corresponding to each of the M time domain positions according to:

$$N_{TA_i} = N_{TA_{i-1}} + D_{i-1} \times (t_i - t_{i-1}) + \frac{1}{2} V_{i-1} \times (t_i - t_{i-1})^2, \text{ or}$$

$$N_{TA_i} = N_{TA_{i-1}} + D_{i-1} \times (t_i - t_{i-1} + \delta_{t_0}) + \frac{1}{2} V_{i-1} \times (t_i - t_{i-1} + \delta_{t_0})^2,$$

where $t_i$ represents an (i+1)-th time domain position among the M time domain positions, i=1, 2 . . . , M−1, $t_0$ represents a first time domain position among the M time domain positions, $N_{TA_{i-1}}$ represents the first timing value corresponding to the time domain position $t_{i-1}$, $N_{TA_i}$ represents the first timing value corresponding to the time domain position $t_i$, $D_{i-1}$ represents the offset rate of the first timing value corresponding to $t_{i-1}$, $V_{i-1}$ represents the rate of change of the offset rate of the first timing value corresponding to $t_{i-1}$, and $\delta_{t_0}$ represents a one-way propagation delay from the network device to the terminal device at the time domain position $t_0$ of the terminal device.

In some embodiments, the terminal device 300 may further include: a processing unit 320 configured to determine a first timing value corresponding to a first time domain position according to the first timing values corresponding to the M time domain positions, the first time domain position being a time domain position corresponding to the first time period or a time domain position in the first time period.

In some embodiments, the processing unit 320 may be configured to: determine the first timing value corresponding to the first time domain position according to:

$$N_{TA_t} = N_{TA_{k-1}} + \left(\frac{N_{TA_k} - N_{TA_{k-1}}}{t_k - t_{k-1}}\right) \times (t - t_{k-1}), \text{ or}$$

$$N_{TA_t} = N_{TA_{k-1}} + \left(\frac{N_{TA_k} - N_{TA_{k-1}}}{t_k - t_{k-1}}\right) \times (t - t_{k-1} + \delta_{t_0}),$$

wherein the first time domain position is a time domain position between $t_{k-1}$ and $t_k$, or the first time domain position is a time domain position before $t_{k-1}$, or the first time domain position is a time domain position after $t_k$; and wherein t represents the first time domain position, $N_{TA_t}$ represents the first timing value corresponding to the first time domain position, $t_{k-1}$ represents a k-th time domain position among the M time domain positions, $N_{TA_{k-1}}$ represents the first timing value corresponding to $t_{k-1}$, $t_k$ represents a (k+1)-th time domain position among the M time domain positions, $N_{TA_k}$ represents the first timing value corresponding to $t_k$, and $\delta_{t_0}$ represents a one-way propagation delay from the network device to the terminal device at the time domain position $t_0$ of the terminal device.

In some embodiments, the processing unit 320 may be configured to: determine the first timing value corresponding to the first time domain position according to:

$$N_{TA_t} = N_{TA_0} + D_0 \times (t - t_0) \text{ or } N_{TA_t} = N_{TA_0} + D_0 \times (t - t_0 + \delta_{t_0}),$$

wherein the first time domain position is a time domain position before $t_0$, or the first time domain position is a time domain position after $t_0$; and wherein t represents the first time domain position, $N_{TA_t}$ represents the first timing value corresponding to the first time domain position, $N_{TA_0}$ represents the first timing value corresponding to the time domain position $t_0$, $t_0$ represents the first time domain position among the M time domain positions, $D_0$ represents an offset rate of the first timing value corresponding to $t_0$, and $\delta_{t_0}$ represents a one-way propagation delay from the network device to the terminal device at the time domain position $t_0$ of the terminal device.

In some embodiments, the processing unit 320 may be configured to: determine the first timing value corresponding to the first time domain position according to:

$$N_{TA_t} = N_{TA_0} + D_0 \times (t - t_0) + \frac{1}{2} V_0 \times (t - t_0)^2, \text{ or}$$

$$N_{TA_t} = N_{TA_0} + D_0 \times (t - t_0 + \delta_{t_0}) + \frac{1}{2} V_0 \times (t - t_0 + \delta_{t_0})^2,$$

wherein the first time domain position is a time domain position before $t_0$, or the first time domain position is a time domain position after $t_0$;

wherein t represents the first time domain position, $N_{TA_t}$ represents the first timing value corresponding to the first time domain position, $N_{TA_0}$ represents the first timing value corresponding to the time domain position $t_0$, $t_0$ represents the first time domain position among the M time domain positions, $D_0$ represents an offset rate of the first timing value corresponding to $t_0$, $V_0$ represents a rate of change of the offset rate of the first timing value corresponding to $t_0$, and $\delta_{t_0}$ represents a one-way propagation delay from the network device to the terminal device at the time domain position $t_0$ of the terminal device.

In some embodiments, the processing unit 320 may be configured to: perform time domain synchronization corresponding to the first time domain position according to the first timing value corresponding to the first time domain position.

In some embodiments, an interval between any two adjacent time domain positions among the M time domain positions may be equal.

In some embodiments, the interval between any two adjacent time domain positions among the M time domain positions may be a first length.

In some embodiments, the first length may be configured by the network device via at least one of a system message, a Radio Resource Control (RRC) message, a Media Access Control Control Element (MAC CE), or Downlink Control Information (DCI); or the first length may be predefined or agreed in a protocol.

In some embodiments, an interval between any two adjacent time domain positions among the M time domain positions may not be equal.

In some embodiments, at least one of the M time domain positions may be associated with a time domain position corresponding to ephemeris information, or at least one of the M time domain positions may be a time domain position among time domain positions corresponding to ephemeris information.

In some embodiments, each of the M time domain positions may correspond to a respective one of the time domain positions corresponding to the ephemeris information.

In some embodiments, the first time period may be associated with a second length, or a length of the first time period may be the second length.

In some embodiments, the second length may be configured by the network device via at least one of a system message, an RRC message, a MAC CE, or DCI; or the second length may be predefined or agreed in a protocol.

In some embodiments, the first information may be configured by the network device via at least one of a system message, an RRC message, or a MAC CE.

In some embodiments, content included in the first information may be determined according to second information.

In some embodiments, the second information may be configured by the network device via at least one of a system message, an RRC message, or a MAC CE.

In some embodiments, the second information may be used to determine whether a scenario corresponding to the network device is a Geostationary Earth Orbit (GEO) scenario or a non-GEO scenario, wherein the content included in the first information in the GEO scenario is different from the content included in the first information in the non-GEO scenario.

In some embodiments, the first information may be associated with at least one of: time domain position information, an ephemeris information format, ephemeris information, a group identifier, a reference signal index, a cell identifier, an antenna polarization mode, a satellite identifier, a serving satellite, a service time length of the serving satellite, a satellite to serve, time at which the satellite to serve starts to serve, a satellite to stop serving, or time at which the satellite to stop serving stops serving.

In some embodiments, the processing unit 320 may be configured to: obtain time domain and/or frequency domain synchronization corresponding to at least one time domain position corresponding to the first time period according to the first information.

In some embodiments, the above communication unit may be a communication interface or a transceiver, or an input/output interface of a communication chip or a system-on-chip. The above processing unit may be one or more processors.

It should be understood that the terminal device 300 according to the embodiment of the present disclosure may correspond to the terminal device in the method embodiment of the present disclosure, and the above and other operations and/or functions of the respective units in the terminal device 300 are provided for the purpose of implementing the corresponding processes corresponding to the terminal device in the method 200 shown in FIG. 8, and details thereof will be omitted here for brevity.

Figure 11:
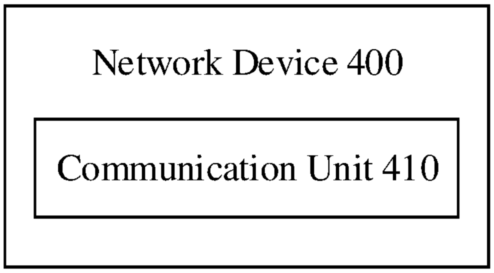
FIG. 11 is a schematic block diagram of a network device according to an embodiment of the present disclosure.

FIG. 11 shows a schematic block diagram of a network device 400 according to an embodiment of the present disclosure. As shown in FIG. 11, the network device 400 includes: a communication unit 410 configured to transmit first information to a terminal device, the first information being associated with a first time period.

The first information is used to obtain at least one of: a first timing value, an offset rate of a first timing value, a rate of change of an offset rate of a first timing value, a first frequency offset value, an offset rate of a first frequency offset value, a rate of change of an offset rate of a first frequency offset value, first ephemeris information, the first time period, or one or more time domain positions corresponding to the first time period, or the first information includes at least one of: a first timing value, an offset rate of a first timing value, a rate of change of an offset rate of a first timing value, a first frequency offset value, an offset rate of a first frequency offset value, a rate of change of an offset rate of a first frequency offset value, first ephemeris information, the first time period, or one or more time domain positions corresponding to the first time period.

In some embodiments, the first information being associated with the first time period may include: the first information being associated with M time domain positions included in the first time period, where M is a positive integer greater than or equal to 1.

In some embodiments, the first information may be used to obtain at least one of: a first timing value corresponding to each of one or more of the M time domain positions, an offset rate of a first timing value corresponding to each of one or more of the M time domain positions, a rate of change of an offset rate of a first timing value corresponding to each of one or more of the M time domain positions, a first frequency offset value corresponding to each of one or more of the M time domain positions, an offset rate of a first frequency offset value corresponding to each of one or more of the M time domain positions, or a rate of change of an offset rate of a first frequency offset value corresponding to each of one or more of the M time domain positions, or the first information may include at least one of: a first timing value corresponding to each of one or more of the M time domain positions, an offset rate of a first timing value corresponding to each of one or more of the M time domain positions, a rate of change of an offset rate of a first timing value corresponding to each of one or more of the M time domain positions, a first frequency offset value corresponding to each of one or more of the M time domain positions, an offset rate of a first frequency offset value corresponding to each of one or more of the M time domain positions, or a rate of change of an offset rate of a first frequency offset value corresponding to each of one or more of the M time domain positions.

In some embodiments, the first information may be used to obtain a first timing value corresponding to each of the M time domain positions, or the first information may include a first timing value corresponding to each of the M time domain positions.

In some embodiments, the first information may be used to obtain a first timing value corresponding to each of at least one of the M time domain positions and an offset rate of a first timing value corresponding to each of at least one of the M time domain positions; or the first information may include a first timing value corresponding to each of at least one of the M time domain positions and an offset rate of a first timing value corresponding to each of at least one of the M time domain positions.

In some embodiments, the first information may be used to obtain a first timing value corresponding to a first time domain position among the M time domain positions, and may be used to obtain an offset rate of a first timing value corresponding to each of at least two of the M time domain positions; or the first information may include a first timing value corresponding to a first time domain position among the M time domain positions, and may include an offset rate of a first timing value corresponding to each of at least two of the M time domain positions.

In some embodiments, the first information may be used to obtain a first timing value corresponding to each of at least one of the M time domain positions, an offset rate of a first timing value corresponding to each of at least one of the M time domain positions, and a rate of change of an offset rate of a first timing value corresponding to each of at least one of the M time domain positions; or the first information may include a first timing value corresponding to each of at least one of the M time domain positions, an offset rate of a first timing value corresponding to each of at least one of the M time domain positions, and a rate of change of an offset rate of a first timing value corresponding to each of at least one of the M time domain positions.

In some embodiments, the first information may be used to obtain a first timing value corresponding to a first time domain position among the M time domain positions, and may be used to obtain an offset rate of a first timing value corresponding to each of at least one of the M time domain positions, and may be used to obtain a rate of change of an offset rate of a first timing value corresponding to each of at least two of the M time domain positions; or the first information may include a first timing value corresponding to a first time domain position among the M time domain positions, and may include an offset rate of a first timing value corresponding to each of at least one of the M time domain positions, and may include a rate of change of an offset rate of a first timing value corresponding to each of at least two of the M time domain positions; or the first information may be used to obtain a first timing value corresponding to a first time domain position among the M time domain positions, and may be used to obtain an offset rate of a first timing value corresponding to each of at least two of the M time domain positions, and may be used to obtain a rate of change of an offset rate of a first timing value corresponding to each of at least two of the M time domain positions; or the first information may include a first timing value corresponding to a first time domain position among the M time domain positions, and may include an offset rate of a first timing value corresponding to each of at least two of the M time domain positions, and may include a rate of change of an offset rate of a first timing value corresponding to each of at least two of the M time domain positions.

In some embodiments, an interval between any two adjacent time domain positions among the M time domain positions may be equal.

In some embodiments, the interval between any two adjacent time domain positions among the M time domain positions may be a first length.

In some embodiments, the first length may be configured by the network device via at least one of a system message, a Radio Resource Control (RRC) message, a Media Access Control Control Element (MAC CE), or Downlink Control Information (DCI); or the first length may be predefined or agreed in a protocol.

In some embodiments, an interval between any two adjacent time domain positions among the M time domain positions may not be equal.

In some embodiments, at least one of the M time domain positions may be associated with a time domain position corresponding to ephemeris information, or at least one of the M time domain positions may be a time domain position among time domain positions corresponding to ephemeris information.

In some embodiments, each of the M time domain positions may correspond to a respective one of the time domain positions corresponding to the ephemeris information.

In some embodiments, the first time period may be associated with a second length, or a length of the first time period may be the second length.

In some embodiments, the second length may be configured or agreed in a protocol, or the second length may be configured by the network device.

In some embodiments, the second length may be configured by the network device via at least one of a system message, an RRC message, a MAC CE, or DCI; or the second length may be predefined or agreed in a protocol.

In some embodiments, the first information may be configured by the network device via at least one of a system message, an RRC message, or a MAC CE.

In some embodiments, content included in the first information may be determined according to second information.

In some embodiments, the second information may be configured by the network device via at least one of a system message, an RRC message, or a MAC CE.

In some embodiments, the second information may be used to determine whether a scenario corresponding to the network device is a Geostationary Earth Orbit (GEO) scenario or a non-GEO scenario, wherein the content included in the first information in the GEO scenario is different from the content included in the first information in the non-GEO scenario.

In some embodiments, the first information may be associated with at least one of: time domain position information, an ephemeris information format, ephemeris information, a group identifier, a reference signal index, a cell identifier, an antenna polarization mode, a satellite identifier, a serving satellite, a service time length of the serving satellite, a satellite to serve, time at which the satellite to serve starts to serve, a satellite to stop serving, or time at which the satellite to stop serving stops serving.

In some embodiments, the above communication unit may be a communication interface or a transceiver, or an input/output interface of a communication chip or a system-on-chip. The above processing unit may be one or more processors.

It should be understood that the network device 400 according to the embodiment of the present disclosure may correspond to the network device in the method embodiment of the present disclosure, and the above and other operations and/or functions of the respective units in the network device 400 are provided for the purpose of implementing the corresponding processes corresponding to the network device in the method 200 shown in FIG. 8, and details thereof will be not omitted here for brevity.

Figure 12:
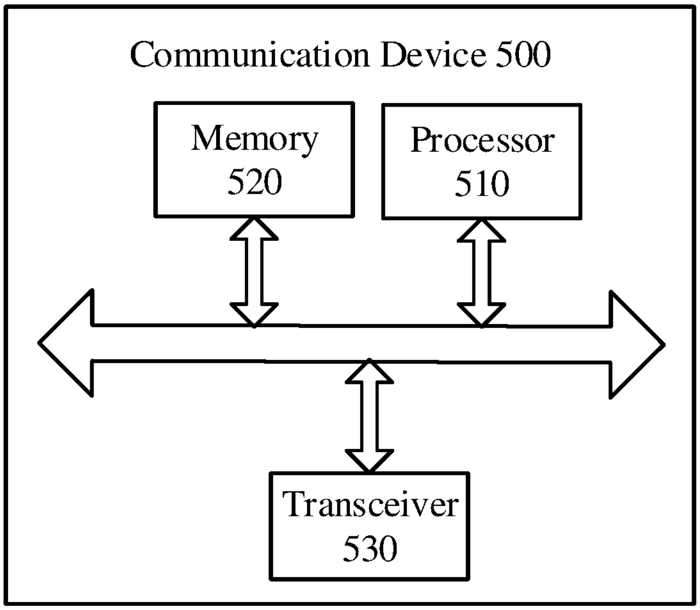
FIG. 12 is a schematic block diagram of a communication device according to an embodiment of the present disclosure.

FIG. 12 is a schematic diagram showing a structure of a communication device 500 according to an embodiment of the present disclosure. The communication device 500 shown in FIG. 12 includes a processor 510, and the processor 510 can invoke and execute a computer program from a memory to implement the method in the embodiment of the present disclosure.

In some embodiments, as shown in FIG. 12, the communication device 500 may further include a memory 520. The processor 510 can invoke and execute a computer program from the memory 520 to implement the method in the embodiment of the present disclosure.

The memory 520 may be a separate device independent from the processor 510, or may be integrated in the processor 510.

In some embodiments, as shown in FIG. 12, the communication device 500 may further include a transceiver 530, and the processor 510 may control the transceiver 530 to communicate with other devices, and in particular, transmit information or data to other devices, or receive information or data transmitted by other devices.

Here, the transceiver 530 may include a transmitter and a receiver. The transceiver 630 may further include one or more antennas.

In some embodiments, the communication device 500 may specifically be the network device according to the embodiment of the present disclosure, and the communication device 500 may implement the corresponding processes implemented by the network device in any of the methods according to the embodiments of the present disclosure. For the sake of brevity, details thereof will be omitted here.

In some embodiments, the communication device 500 may specifically be the terminal device according to the embodiment of the present disclosure, and the communication device 500 may implement the corresponding processes implemented by the terminal device in any of the methods according to the embodiments of the present disclosure. For the sake of brevity, details thereof will be omitted here.

Figure 13:
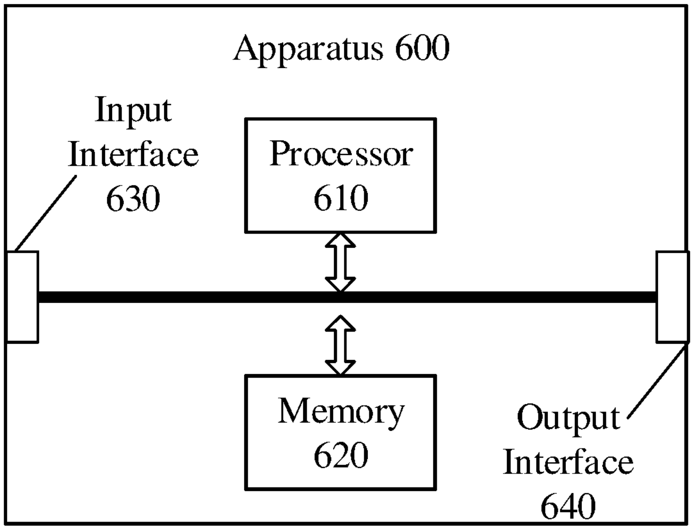
FIG. 13 is a schematic block diagram of an apparatus according to an embodiment of the present disclosure.

FIG. 13 is a schematic diagram showing a structure of an apparatus according to an embodiment of the present disclosure. The apparatus 600 shown in FIG. 12 includes a processor 610, and the processor 610 can invoke and execute a computer program from a memory to implement the method in the embodiment of the present disclosure.

In some embodiments, as shown in FIG. 13, the apparatus 600 may further include a memory 620. The processor 610 can invoke and execute a computer program from the memory 620 to implement the method in the embodiment of the present disclosure.

The memory 620 may be a separate device independent from the processor 610, or may be integrated in the processor 610.

In some embodiments, the apparatus 600 may further include an input interface 630. The processor 610 can control the input interface 630 to communicate with other devices or chips, and in particular, obtain information or data transmitted by other devices or chips.

In some embodiments, the apparatus 600 may further include an output interface 640. The processor 610 can control the output interface 640 to communicate with other devices or chips, and in particular, output information or data to other devices or chips.

In some embodiments, the apparatus can be applied in the network device in the embodiment of the present disclosure, and the apparatus can implement the corresponding processes implemented by the network device in the methods of the embodiments of the present disclosure. For the sake of brevity, details thereof will be omitted here.

In some embodiments, the apparatus can be applied in the terminal device in the embodiment of the present disclosure, and the apparatus can implement the corresponding processes implemented by the terminal device in the methods of the embodiments of the present disclosure. For the sake of brevity, details thereof will be omitted here.

In some embodiments, the apparatus in the embodiment of the present disclosure may be a chip, e.g., a system-level chip, a system-chip, a chip system, or a system-on-chip.

Figure 14:
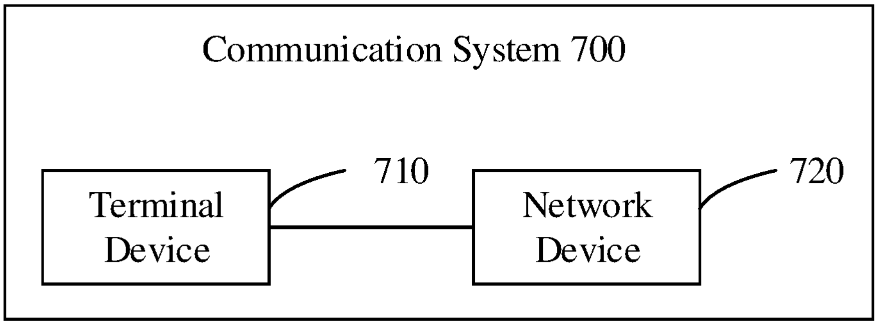
FIG. 14 is a schematic block diagram of a communication system according to an embodiment of the present disclosure.

FIG. 14 is a schematic block diagram of a communication system 700 according to an embodiment of the present disclosure. As shown in FIG. 14, the communication system 700 includes a terminal device 710 and a network device 720.

Here, the terminal device 710 can be configured to implement the corresponding functions implemented by the terminal device in the above method, and the network device 720 can be configured to implement the corresponding functions implemented by the network device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

In some embodiments, the computer readable storage medium can be applied in the network device in the embodiment of the present disclosure, and the computer program can cause a computer to perform corresponding processes implemented by the network device in the method according to any of the embodiments of the present disclosure. Details thereof will be omitted here for simplicity.

In some embodiments, the computer readable storage medium can be applied in the terminal device in the embodiment of the present disclosure, and the computer program can cause a computer to perform corresponding processes implemented by the terminal device in the method according to any of the embodiments of the present disclosure. Details thereof will be omitted here for simplicity.

An embodiment of the present disclosure also provides a computer program product including computer program instructions.

In some embodiments, the computer program product can be applied in the network device in the embodiment of the present disclosure, and the computer program instructions can cause a computer to perform corresponding processes implemented by the network device in the method according to any of the embodiments of the present disclosure. Details thereof will be omitted here for simplicity.

In some embodiments, the computer program product can be applied in the terminal device in the embodiment of the present disclosure, and the computer program instructions can cause a computer to perform corresponding processes implemented by the terminal device in the method according to any of the embodiments of the present disclosure. Details thereof will be omitted here for simplicity.

An embodiment of the present disclosure also provides a computer program.

In some embodiments, the computer program can be applied to the network device in the embodiment of the present disclosure. The computer program, when executed on a computer, can cause the computer to perform corresponding processes implemented by the network device in the method according to any of the embodiments of the present disclosure. Details thereof will be omitted here for simplicity.

In some embodiments, the computer program can be applied to the terminal device in the embodiment of the present disclosure. The computer program, when executed on a computer, can cause the computer to perform corresponding processes implemented by the terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, apparatuses, and units described above, reference can be made to the corresponding processes in the foregoing method embodiments, and details thereof will be omitted here.

In the embodiments of the present disclosure, it can be appreciated that the disclosed systems, apparatuses, and methods may be implemented in other ways. For example, the apparatus embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A wireless communication method, comprising:

receiving, by a terminal device, first information transmitted by a network device, wherein the first information is associated with a first time period, and the first information is used to obtain at least one of:

a first timing value, an offset rate of a first timing value, a rate of change of an offset rate of a first timing value, a first frequency offset value, an offset rate of a first frequency offset value, a rate of change of an offset rate of a first frequency offset value, first ephemeris information, the first time period, or one or more time domain positions corresponding to the first time period;

wherein the first information being associated with the first time period comprises:

the first information being associated with M time domain positions included in the first time period, where M is a positive integer greater than or equal to 1, wherein the first information is used to obtain at least one of:

a first timing value corresponding to each of one or more of the M time domain positions, an offset rate of a first timing value corresponding to each of one or more of the M time domain positions, a rate of change of an offset rate of a first timing value corresponding to each of one or more of the M time domain positions, a first frequency offset value corresponding to each of one or more of the M time domain positions, an offset rate of a first frequency offset value corresponding to each of one or more of the M time domain positions, or a rate of change of an offset rate of a first frequency offset value corresponding to each of one or more of the M time domain positions, wherein the method further comprises:

obtaining, by the terminal device, first timing values corresponding to the M time domain positions according to the first information.

2. The method according to claim 1, wherein the first information is used to obtain a first timing value corresponding to each of at least one of the M time domain positions, an offset rate of a first timing value corresponding to each of at least one of the M time domain positions, and a rate of change of an offset rate of a first timing value corresponding to each of at least one of the M time domain positions.

3. The method according to claim 2, wherein:

the first information is used to obtain a first timing value corresponding to a first time domain position among the M time domain positions, an offset rate of a first timing value corresponding to each of at least one of the M time domain positions, and a rate of change of an offset rate of a first timing value corresponding to each of at least two of the M time domain positions; or the first information is used to obtain a first timing value corresponding to a first time domain position among the M time domain positions, an offset rate of a first timing value corresponding to each of at least two of the M time domain positions, and a rate of change of an offset rate of a first timing value corresponding to each of at least two of the M time domain positions.

4. The method according to claim 2, wherein said obtaining, by the terminal device, the first timing values corresponding to the M time domain positions according to the first information comprises:

determining, by the terminal device, the first timing value corresponding to each of the M time domain positions according to:

$$N_{TA_i} = N_{TA_{i-1}} + D_{i-1}\times(t_i - t_{i-1}) + \frac{1}{2}V_{i-1}\times(t_i - t_{i-1})^2, \text{ or}$$

$$N_{TA_i} = N_{TA_{i-1}} + D_{i-1}\times(t_i - t_{i-1} + \delta_{t_0}) + \frac{1}{2}V_{i-1}\times(t_i - t_{i-1} + \delta_{t_0})^2,$$

where $t_i$ represents an (i+1)-th time domain position among the M time domain positions, i=1, 2 . . . ,M−1, $t_0$ to represents a first time domain position among the M time domain positions, $N_{TA_{i-1}}$, represents the first timing value corresponding to the time domain position $t_{i-1}$, $N_{TA_i}$ represents the first timing value corresponding to the time domain position $t_{i-1}$, $D_{i-1}$ represents the offset rate of the first timing value corresponding to $t_{i-1}$, $V_{i-1}$ represents the rate of change of the offset rate of the first timing value corresponding to $t_{i-1}$, and $\delta_{t_0}$ represents a one-way propagation delay from the network device to the terminal device at the time domain position $t_0$ of the terminal device.

5. The method according to claim 1, further comprising:

determining, by the terminal device, a first timing value corresponding to a first time domain position according to the first timing values corresponding to the M time domain positions, the first time domain position being a time domain position corresponding to the first time period or a time domain position in the first time period.

6. The method according to claim 5, wherein said determining, by the terminal device, the first timing value corresponding to the first time domain position according to the first timing values corresponding to the M time domain positions comprises:

determining, by the terminal device, the first timing value corresponding to the first time domain position according to:

$$N_{TA_t} = N_{TA_0} + D_0\times(t - t_0) + \frac{1}{2}V_0\times(t - t_0)^2, \text{ or}$$

$$N_{TA_t} = N_{TA_0} + D_0\times(t - t_0 + \delta_{t_0}) + \frac{1}{2}V_0\times(t - t_0 + \delta_{t_0})^2,$$

wherein the first time domain position is a time domain position before $t_0$, or the first time domain position is a time domain position after $t_0$;

wherein t represents the first time domain position, $N_{TA_t}$ represents the first timing value corresponding to the first time domain position, $N_{TA_0}$ represents the first timing value corresponding to the time domain position $t_0$, $t_0$ represents the first time domain position among the M time domain positions, $D_0$ represents an offset rate of the first timing value corresponding to $t_0$, $V_0$ represents a rate of change of the offset rate of the first timing value corresponding to $t_0$, and $\delta_{t_0}$, represents a one-way propagation delay from the network device to the terminal device at the time domain position $t_0$ of the terminal device.

7. The method according to claim 1, wherein the first time period is associated with a second length, or a length of the first time period is the second length, wherein:

the second length is configured by the network device via at least one of a system message, an RRC message, a MAC CE, or DCI; or second length is predefined or agreed in a protocol.

8. The method according to claim 1, wherein the first information is configured by the network device via at least one of a system message, an RRC message, or a MAC CE.

9. The method according to claim 1, wherein the first information is associated with at least one of:

time domain position information, an ephemeris information format, ephemeris information, a group identifier, a reference signal index, a cell identifier, an antenna polarization mode, a satellite identifier, a serving satellite, a service time length of the serving satellite, a satellite to serve, time at which the satellite to serve starts to serve, a satellite to stop serving, or time at which the satellite to stop serving stops serving.

10. The method according to claim 1, further comprising:

obtaining, by the terminal device, time domain and/or frequency domain synchronization corresponding to at least one time domain position corresponding to the first time period according to the first information.

11. A terminal device, comprising a processor and a memory, wherein the memory has a computer program stored thereon, and the processor is configured to invoke and execute the computer program stored in the memory to perform:

receiving first information transmitted by a network device, wherein the first information is associated with a first time period, and the first information is used to obtain at least one of:

a first timing value, an offset rate of a first timing value, a rate of change of an offset rate of a first timing value, a first frequency offset value, an offset rate of a first frequency offset value, a rate of change of an offset rate of a first frequency offset value, first ephemeris information, the first time period, or one or more time domain positions corresponding to the first time period;

wherein the first information is associated with the first time period comprises:

the first information is associated with M time domain positions included in the first time period, where M is a positive integer greater than or equal to 1, wherein the first information is used to obtain at least one of:

a first timing value corresponding to each of one or more of the M time domain positions, an offset rate of a first timing value corresponding to each of one or more of the M time domain positions, a rate of change of an offset rate of a first timing value corresponding to each of one or more of the M time domain positions, a first frequency offset value corresponding to each of one or more of the M time domain positions, an offset rate of a first frequency offset value corresponding to each of one or more of the M time domain positions, or a rate of change of an offset rate of a first frequency offset value corresponding to each of one or more of the M time domain positions, wherein the processor further performs:

obtaining first timing values corresponding to the M time domain positions according to the first information.

12. The terminal device according to claim 11, wherein the first information is used to obtain a first timing value corresponding to each of at least one of the M time domain positions, an offset rate of a first timing value corresponding to each of at least one of the M time domain positions, and a rate of change of an offset rate of a first timing value corresponding to each of at least one of the M time domain positions.

13. The terminal device according to claim 12, wherein:

the first information is used to obtain a first timing value corresponding to a first time domain position among the M time domain positions, an offset rate of a first timing value corresponding to each of at least one of the M time domain positions, and a rate of change of an offset rate of a first timing value corresponding to each of at least two of the M time domain positions; or the first information is used to obtain a first timing value corresponding to a first time domain position among the M time domain positions, an offset rate of a first timing value corresponding to each of at least two of the M time domain positions, and a rate of change of an offset rate of a first timing value corresponding to each of at least two of the M time domain positions.

14. A network device, comprising a processor and a memory, wherein the memory has a computer program stored thereon, and the processor is configured to invoke and execute the computer program stored in the memory to perform:

transmitting first information to a terminal device, the first information being associated with a first time period; wherein the first information is used to obtain at least one of:

a first timing value, an offset rate of a first timing value, a rate of change of an offset rate of a first timing value, a first frequency offset value, an offset rate of a first frequency offset value, a rate of change of an offset rate of a first frequency offset value, first ephemeris information, the first time period, or one or more time domain positions corresponding to the first time period, or the first information comprises at least one of:

a first timing value, an offset rate of a first timing value, a rate of change of an offset rate of a first timing value, a first frequency offset value, an offset rate of a first frequency offset value, a rate of change of an offset rate of a first frequency offset value, first ephemeris information, the first time period, or one or more time domain positions corresponding to the first time period;

wherein the first information being associated with the first time period comprises: the first information being associated with M time domain positions included in the first time period, where M is a positive integer greater than or equal to 1, wherein:

the first information is used to obtain at least one of: a first timing value corresponding to each of one or more of the M time domain positions, an offset rate of a first timing value corresponding to each of one or more of the M time domain positions, a rate of change of an offset rate of a first timing value corresponding to each of one or more of the M time domain positions, a first frequency offset value corresponding to each of one or more of the M time domain positions, an offset rate of a first frequency offset value corresponding to each of one or more of the M time domain positions, or a rate of change of an offset rate of a first frequency offset value corresponding to each of one or more of the M time domain positions, or the first information comprises at least one of: a first timing value corresponding to each of one or more of the M time domain positions, an offset rate of a first timing value corresponding to each of one or more of the M time domain positions, a rate of change of an offset rate of a first timing value corresponding to each of one or more of the M time domain positions, a first frequency offset value corresponding to each of one or more of the M time domain positions, an offset rate of a first frequency offset value corresponding to each of one or more of the M time domain positions, or a rate of change of an offset rate of a first frequency offset value corresponding to each of one or more of the M time domain positions, wherein:

the first information is used to obtain a first timing value corresponding to each of the M time domain positions, or the first information comprises a first timing value corresponding to each of the M time domain positions.

15. The network device according to claim 14, wherein:

the first information is used to obtain a first timing value corresponding to each of at least one of the M time domain positions and an offset rate of a first timing value corresponding to each of at least one of the M time domain positions; or the first information comprises a first timing value corresponding to each of at least one of the M time domain positions and an offset rate of a first timing value corresponding to each of at least one of the M time domain positions.

16. The network device according to claim 15, wherein:

the first information is used to obtain a first timing value corresponding to a first time domain position among the M time domain positions, and is used to obtain an offset rate of a first timing value corresponding to each of at least two of the M time domain positions; or the first information comprises a first timing value corresponding to a first time domain position among the M time domain positions, and an offset rate of a first timing value corresponding to each of at least two of the M time domain positions.

17. The network device according to claim 14, wherein:

the first information is used to obtain a first timing value corresponding to each of at least one of the M time domain positions, an offset rate of a first timing value corresponding to each of at least one of the M time domain positions, and a rate of change of an offset rate of a first timing value corresponding to each of at least one of the M time domain positions; or the first information comprises a first timing value corresponding to each of at least one of the M time domain positions, an offset rate of a first timing value corresponding to each of at least one of the M time domain positions, and a rate of change of an offset rate of a first timing value corresponding to each of at least one of the M time domain positions.

18. The network device according to claim 17, wherein:

the first information is used to obtain a first timing value corresponding to a first time domain position among the M time domain positions, an offset rate of a first timing value corresponding to each of at least one of the M time domain positions, and a rate of change of an offset rate of a first timing value corresponding to each of at least two of the M time domain positions; or the first information comprises a first timing value corresponding to a first time domain position among the M time domain positions, an offset rate of a first timing value corresponding to each of at least one of the M time domain positions, and a rate of change of an offset rate of a first timing value corresponding to each of at least two of the M time domain positions; or the first information is used to obtain a first timing value corresponding to a first time domain position among the M time domain positions, an offset rate of a first timing value corresponding to each of at least two of the M time domain positions, and a rate of change of an offset rate of a first timing value corresponding to each of at least two of the M time domain positions; or the first information comprises a first timing value corresponding to a first time domain position among the M time domain positions, an offset rate of a first timing value corresponding to each of at least two of the M time domain positions, and a rate of change of an offset rate of a first timing value corresponding to each of at least two of the M time domain positions.

19. The network device according to claim 14, wherein the first time period is associated with a second length, or a length of the first time period is the second length, wherein the second length is configured or agreed in a protocol, or the second length is configured by the network device, wherein the second length is configured by the network device via at least one of a system message, an RRC message, a MAC CE, or DCI; or the second length is predefined or agreed in a protocol, wherein the first information is configured by the network device via at least one of a system message, an RRC message, or a MAC CE.

20. The network device according to claim 14, wherein the first information is associated with at least one of:

time domain position information, an ephemeris information format, ephemeris information, a group identifier, a reference signal index, a cell identifier, an antenna polarization mode, a satellite identifier, a serving satellite, a service time length of the serving satellite, a satellite to serve, time at which the satellite to serve starts to serve, a satellite to stop serving, or time at which the satellite to stop serving stops serving.

* * * * *